(12) United States Patent
Roumeliotis et al.

(10) Patent No.: US 9,709,404 B2
(45) Date of Patent: Jul. 18, 2017

(54) ITERATIVE KALMAN SMOOTHER FOR ROBUST 3D LOCALIZATION FOR VISION-AIDED INERTIAL NAVIGATION

(71) Applicant: Regents of the University of Minnesota, Minneapolis, MN (US)

(72) Inventors: Stergios I. Roumeliotis, St Paul, MN (US); Dimitrios G. Kottas, Minneapolis, MN (US)

(73) Assignee: Regents of the University of Minnesota, Minneapolis, MN (US)

( * ) Notice: Subject to any disclaimer, the term of this patent is extended or adjusted under 35 U.S.C. 154(b) by 0 days.

(21) Appl. No.: 15/130,736

(22) Filed: Apr. 15, 2016

(65) Prior Publication Data

US 2016/0305784 A1    Oct. 20, 2016

Related U.S. Application Data

(60) Provisional application No. 62/149,194, filed on Apr. 17, 2015.

(51) Int. Cl.
| | |
|---|---|
| G01C 21/16 | (2006.01) |
| G06K 9/52 | (2006.01) |
| G06K 9/62 | (2006.01) |
| G06T 7/00 | (2006.01) |
| G06T 7/20 | (2006.01) |
| G06T 7/246 | (2017.01) |
| G06T 7/277 | (2017.01) |

(52) U.S. Cl.
CPC ............ *G01C 21/165* (2013.01); *G06K 9/52* (2013.01); *G06K 9/6267* (2013.01); *G06T 7/246* (2017.01); *G06T 7/277* (2017.01); *G06T 2207/10016* (2013.01); *G06T 2207/30244* (2013.01)

(58) Field of Classification Search
CPC ...... G01C 21/165; G06K 9/6267; G06K 9/52; G06T 7/277; G06T 7/246; G06T 2207/10016; G06T 2207/30244
See application file for complete search history.

(56) References Cited

U.S. PATENT DOCUMENTS

| | | | |
|---|---|---|---|
| 5,847,755 A | 12/1998 | Wixson et al. | |
| 7,015,831 B2 | 3/2006 | Karlsson et al. | |
| 7,162,338 B2 | 1/2007 | Goncalves et al. | |
| 7,991,576 B2 | 8/2011 | Roumeliotis | |
| 8,577,539 B1 * | 11/2013 | Morrison ............. | G01C 21/165 701/28 |

(Continued)

FOREIGN PATENT DOCUMENTS

| | | |
|---|---|---|
| WO | WO 2015013418 | 1/2015 |
| WO | WO 2015013534 A1 | 1/2015 |

OTHER PUBLICATIONS

Kottas et al "An Iterative Kalman Smoother for Robust 3D Localization and mapping," ISRR, Tech Report, Oct. 16, 2014, 15 pp.

(Continued)

*Primary Examiner* — Marthe Marc-Coleman
(74) *Attorney, Agent, or Firm* — Shumaker & Sieffert, P.A.

(57) ABSTRACT

A vision-aided inertial navigation system (VINS) is described in which a filter-based sliding-window estimator implements an Iterative Kalman Smoother (IKS) to track the 3D motion of a VINS system, such as a mobile device, in real-time using visual and inertial measurements.

19 Claims, 11 Drawing Sheets

(56) References Cited

U.S. PATENT DOCUMENTS

| | | | |
|---|---|---|---|
| 8,996,311 | B1 | 3/2015 | Morin et al. |
| 9,243,916 | B2 | 1/2016 | Roumeliotis et al. |
| 2002/0198632 | A1 | 12/2002 | Breed et al. |
| 2004/0073360 | A1 | 4/2004 | Foxlin |
| 2004/0167667 | A1 | 8/2004 | Goncalves et al. |
| 2008/0167814 | A1 | 7/2008 | Samarasekera et al. |
| 2008/0265097 | A1 | 10/2008 | Stecko et al. |
| 2008/0279421 | A1 | 11/2008 | Hamza et al. |
| 2009/0248304 | A1* | 10/2009 | Roumeliotis ......... G01C 21/16 701/500 |
| 2010/0110187 | A1 | 5/2010 | von Flotow et al. |
| 2010/0220176 | A1* | 9/2010 | Ziemeck ............ A61N 1/36046 348/50 |
| 2012/0121161 | A1 | 5/2012 | Eade |
| 2012/0194517 | A1 | 8/2012 | Izadi et al. |
| 2014/0316698 | A1 | 10/2014 | Roumeliotis et al. |
| 2014/0333741 | A1 | 11/2014 | Roumeliotis et al. |
| 2015/0369609 | A1 | 12/2015 | Roumeliotis et al. |
| 2016/0005164 | A1 | 1/2016 | Roumeliotis et al. |
| 2016/0305784 | A1 | 10/2016 | Roumeliotis et al. |
| 2016/0327395 | A1 | 11/2016 | Roumeliotis et al. |

OTHER PUBLICATIONS

"Project Tango," retrieved from https://www.google.com/atap/projecttango on Nov. 2, 2015, 4 pp.

Ait-Aider et al., "Simultaneous object pose and velocity computation using a single view from a rolling shutter camera," Proceedings of the IEEE European Conference on Computer Vision, May 7-13, 2006, pp. 56-68.

Ayache et al., "Maintaining Representations of the Environment of a Mobile Robot,".IEEE Transactions on Robotics and Automation, vol. 5, No. 6, Dec. 1989, pp. 804-819.

Agarwal et al., "A Survey of Geodetic Approaches to Mapping and the Relationship to Graph-Based SLAM," IEEE Robotics and Automation Magazine, vol. 31, Sep. 2014, 17 pp.

Baker et al., "Removing rolling shutter wobble," Proceedings of the IEEE Conference on Computer Vision and Pattern Recognition, Jun. 13-18, 2010, 8 pp.

Bartoli et al., "Structure from Motion Using Lines: Representation, Triangulation and Bundle Adjustment," Computer Vision and Image Understanding, vol. 100, Aug. 11, 2005, pp. 416-441.

Bayard et al., "An Estimation Algorithm for Vision-Based Exploration of Small Bodies in Space," 2005 American Control Conference, Jun. 8-10, 2005, pp. 4589-4595.

Bierman, "Factorization Methods for Discrete Sequential Estimation," Mathematics in Science and Engineering, Academic Press, vol. 128, 1977, 259 pp.

Bouguet, "Camera Calibration Toolbox for Matlab," retrieved from http://www.vision.caltech.edu/bouguetj/calib_doc/., Oct. 14, 2015, 5 pp.

Boyd et al., "Convex Optimization," Cambridge University Press, 2004, 730 pp. (Applicant points out that, in accordance with MPEP 609.04(a), the 2004 year of publication is sufficiently earlier than the effective U.S. filing date and any foreign priority date of Apr. 17, 2016 so that the particular month of publication is not in issue.).

Breckenridge, "Interoffice Memorandum to T. K. Brown, Quaternions — Proposed Standard Conventions," IOM 343-79/1199, Oct. 31, 1979, 12 pp.

Canny, "A Computational Approach to Edge Detection," IEEE Transactions on Pattern Analysis and Machine Intelligence, vol. 8, No. 6, Nov. 1986, pp. 679-698.

Chen, "Pose Determination from Line-to-Plane Correspondences: Existence Condition and Closed-Form Solutions," Proc. 3rd. Int. Coni. Comp. Vision, Dec. 4-7, 1990, pp. 374-378.

Chiu et al., "Robust vision-aided navigation using sliding-window factor graphs," 2013 IEEE International Conference on Robotics and Automation, May 6-10, 2013, pp. 46-53.

Chiuso et al., "Structure from Motion Causally Integrated Over Time," IEEE Transactions on Pattern Analysis and Machine Intelligence, vol. 24, No. 4, Apr., 2002, pp. 523-535.

Davison et al., "Simultaneous Localisation and Map-Building Using Active Vision," Jun. 2001, 18 pp.

Deans., "Maximally Informative Statistics for Localization and Mapping", Proceedings of the 2002 IEEE International Conference on Robotics & Automation, (Washington, D.C.), May, 2002, 1824-1829.

Dellaert et al., "Square Root SAM: Simultaneous Localization and Mapping via Square Root Information Smoothing," International Journal of Robotics and Research, vol. 25, No. 12, Dec. 2006, pp. 1181-1203.

Diel, "Stochastic Constraints for Vision-Aided Inertial Navigation," Massachusetts Institute of Technology, Department of Mechanical Engineering, Master Thesis, Jan. 2005, 106 pp.

Dong-Si et al., "Motion Tracking with Fixed-lag Smoothing: Algorithm and Consistency Analysis," Proceedings of the IEEE International Conference on Robotics and Automation, May 9-13, 2011, 8 pp.

Eade et al., "Scalable Monocular Slam," Proceedings of the 2006 IEEE Computer Society Conference on Computer Vision and Pattern Recognition (CVPR '06), vol. 1, Jun. 17-22, 2006, 8 pp.

Erdogan et al., "Planar Segmentation of RGBD Images Using Fast Linear Filling and Markov Chain Monte Carlo," Proceedings of the IEEE International Conference on Computer and Robot Vision, May 27-30, 2012, pp. 32-39.

Eustice et al., "Exactly Sparse Delayed-slate Filters for View-based SLAM," IEEE Transactions on Robotics, vol. 22 (6), Dec. 2006, pp. 1100-1114.

Eustice et al., "Visually Navigating the RMS Titanic With SLAM Information Filters," Proceedings of Robotics Science and Systems, Jun. 2005, 9 pp.

Furgale et al., "Unified temporal and spatial calibration for multi-sensor systems," Proceedings of the IEEE/RSJ International Conference on Intelligent Robots and Systems, Nov. 3-7, 2013, pp. 1280-1286.

Garcia et al., "Augmented State Kalman Filtering for AUV Navigation." Proceedings of the 2002 IEEE International Conference on Robotics & Automation, May 2002, 6 pp.

Golub et al., "Matrix Computations, Third Edition," the Johns Hopkins University Press, 2012, 723 pp. (Applicant points out that, in accordance with MPEP 609.04(a), the 2012 year of publication is sufficiently earlier than the effective U.S. filed and any foreign priority date of Apr. 17, 2016 so that the particular month of publication is not in issue.).

Golub et al., "Matrix Computations, Fourth Edition," The Johns Hopkins University Press, 2013, 780 pp.

Guo et al., "Observability-constrained EKF Implementation of the IMU-RGBD Camera Navigation Using Point and Plane Features," Technical Report. University of Minnesota, Mar. 2013, 6 pp.

Guo et al., "IMU-RGBD Camera 3D Pose Estimation and Extrinsic Calibration: Observability Analysis and Consistency Improvement," Proceedings of the IEEE International Conference on Robotics and Automation, May 6-10, 2013, pp. 2920-2927.

Guo et al., "Resource-Aware Large-Scale Cooperative 3D Mapping from Multiple Cell Phones," Multiple Autonomous Robotic Systems (MARS) Lab, ICRA Poster May 26-31, 2015, 1 pp.

Guo et al., "Efficient Visual-Inertial Navigation using a Rolling-Shutter Camera with Inaccurate Timestamps," Proceedings of Robotics: Science and Systems, Jul. 2014, 9 pp.

Harris et al., "A combined corner and edge detector," Proceedings of the Alvey Vision Conference, Aug. 31-Sep. 2, 1988, pp. 147-151.

Hermann et al., "Nonlinear Controllability and Observability," IEEE Transactions on Automatic Control, vol. 22, No. 5, Oct. 1977, pp. 728-740.

Herrera et al., "Joint Depth and Color Camera Calibration with Distortion Correction," IEEE Trans. On Pattern Analysis and Machine Intelligence, vol. 34(10), Oct. 2012, pp. 2058-2064.

Hesch et al., "Consistency analysis and improvement of vision-aided inertial navigation," IEEE Transactions on Robotics, vol. 30, No. 1, Feb. 2014, pp. 158-176.

(56) References Cited

OTHER PUBLICATIONS

Hesch et al., "Observability-constrained Vision-aided Inertial Navigation," University of Minnesota, Department of Computer Science and Engineering, MARS Lab, Feb. 2012, 24 pp.

Hesch et al., "Towards Consistent Vision-aided Inertial Navigation," Proceedings of the 10th International Workshop on the Algorithmic Foundations of Robotics, Jun. 13-15, 2012, 16 pp.

Horn et al., "Closed-form solution of absolute orientation using orthonormal matrices," Journal of the Optical Society of America a, vol. 5, No. 7, Jul. 1988, pp. 1127-1135.

Huang et al., "Observability-based rules for designing consistent EKF slam estimators," International Journal of Robotics Research, vol. 29, No. 5, Apr. 2010, pp. 502-528.

Huang et al., "Visual Odometry and Mapping for Autonomous Flight Using an RGB-D Camera," Proceedings of the International Symposium on Robotics Research, Aug. 28-Sep. 1, 2011, 16 pp.

Huster, "Relative Position Sensing by Fusing Monocular Vision and Inertial Rate Sensors," Stanford University, Department of Electrical Engineering, Dissertation, Jul., 2003, 158 pp.

Jia et al., "Probabilistic 3-D motion estimation for rolling shutter video rectification from visual and inertial measurements," Proceedings of the IEEE International Workshop on Multimedia Signal Processing, Sep. 2012, pp. 203-208.

Johannsson et al., "Temporally Scalable Visual Slam Using a Reduced Pose Graph," in Proceedings of the IEEE International Conference on Robotics and Automation, May 6-10, 2013, 8 pp.

Jones et al., "Visual-inertial Navigation, Mapping and Localization: A Scalable Real-time Causal Approach," International Journal of Robotics Research, vol. 30, No. 4, Mar. 31, 2011, pp. 407-430.

Kaess et al., "iSAM: Incremental Smoothing and Mapping," IEEE Transactions on Robotics, Manuscript, Sep. 7, 2008, 14 pp.

Kaess et al., "iSAM2: Incremental Smoothing and Mapping Using the Bayes Tree," International Journal of Robotics Research, vol. 31, No. 2, Feb. 2012, pp. 216-235.

Kelly et al., "A general framework for temporal calibration of multiple proprioceptive and exteroceptive sensors," Proceedings of International Symposium on Experimental Robotics, Dec. 18-21, 2010, 15 pp.

Kelly et al., "Visual-inertial sensor fusion: Localization, mapping and sensor-to-sensor self-calibration," International Journal of Robotics Research, vol. 30, No. 1, Jan. 2011, pp. 56-79.

Klein et al., "Parallel Tracking and Mapping for Small Ar Workspaces," Proceedings of the IEEE and ACM International Symposium on Mixed and Augmented Reality, Nov. 13-16, 2007, pp. 225-234.

Kneip et al., "Robust Real-Time Visual Odometry with a Single Camera and an IMU," Proceedings of the British Machine Vision Conference, Aug. 29-Sep. 2, 2011, pp. 16.1-16.11.

Konolige et al., "View-based Maps," International Journal of Robotics Research, vol. 29, No. 8, Jul. 2010, 14 pp.

Konolige et al., "Efficient Sparse Pose Adjustment for 2D Mapping," Proceedings of the IEEE/RSJ International Conference on Intelligent Robots and Systems, Oct. 1822, 2010, pp. 22-29.

Konolige et al., "FrameSLAM: From Bundle Adjustment to Real-Time Visual Mapping," IEEE Transactions on Robotics, vol. 24, No. 5, Oct. 2008, pp. 1066-1077.

Kottas et al., "An iterative Kalman smoother for robust 3D localization on mobile and wearable devices," Proceedings of the IEEE International Conference on Robotics and Automation, May 26-30, 2015, pp. 6336-6343.

Kottas et al., "Detecting and dealing with hovering maneuvers in vision-aided inertial navigation systems," Proceedings of the IEEE/RSJ International Conference on Intelligent Robots and Systems, Nov. 3-7, 2013, pp. 3172-3179.

Kottas et al., "Efficient and Consistent Vision-aided Inertial Navigation using Line Observations," Department of Computer Science & Engineering, University of Minnesota, MARS Lab, TR-2012-002, Sep. 2012, 14 pp.

Kottas et al., "On the Consistency of Vision-aided Inertial Navigation," Proceedings of the International Symposium on Experimental Robotics, Jun. 17-20, 2012, 15 pp.

Kummerle et al., "g2o: A General Framework for Graph Optimization," in Proceedings of the IEEE International Conference on Robotics and Automation, May 9-13, 2011, pp. 3607-3613.

Langelaan, "State Estimation for Autonomous Flight in Cluttered Environments," Stanford University, Department of Aeronautics and Astronautics, Dissertation, Mar. 2006, 128 pp.

Leutenegger et al., "Keyframe-based visual-inertial odometry using nonlinear optimization," The International Journal of Robotics Research, vol. 34, No. 3, Mar. 2015, pp. 314-334.

Li et al., "3-D Motion Estimation and Online Temporal Calibration for Camera-IMU Systems," Proceedings of the IEEE International Conference on Robotics and Automation, May 6-10, 2013, pp. 5709-5716.

Li et al., "Improving the Accuracy of EKF-based Visual-Inertial Odometry," 2012 IEEE International Conference on Robotics and Automation, May 14-18, 2012, pp. 828-835.

Li et al., "Optimization-Based Estimator Design for Vision-Aided Inertial Navigation," Proceedings of the Robotics: Science and Systems Conference, Jul. 9-13, 2012, 8 pp.

Li et al., "Real-time Motion Tracking on a Cellphone using Inertial Sensing and a Rolling-Shutter Camera," 2013 IEEE International Conference on Robotics and Automation (ICRA), May 6-10, 2013, 8 pp.

Li et al., "Vision-aided inertial navigation with rolling-shutter cameras," The International Journal of Robotics Research, retrieved from ijr.sagepub.com on May 22, 2015, 18 pp.

Liu et al., "Estimation of Rigid Body Motion Using Straight Line Correspondences," Computer Vision, Graphics, and Image Processing, vol. 43, No. 1, Jul. 1988, pp. 37-52.

Liu et al., "Multi-aided Inertial Navigation for Ground Vehicles in Outdoor Uneven Environments," Proceedings of the IEEE International Conference on Robotics and Automation, Apr. 18-22, 2005, pp. 4703-4708.

Kottas et al., "A Resource-aware Vision-aided Inertial Navigation System for Wearable and Portable Computers," IEEE International Conference on Robotics and Automation, Accepted Apr. 18, 2014, available online May 6, 2014, 3 pp.

Lowe, "Distinctive Image Features from Scale-Invariant Keypoints," International Journal of Computer Vision, Jan. 5, 2004, 28 pp.

Lucas et al., "An Iterative Image Registration Technique with an Application to Stereo Vision," Proceedings of the 7th International Joint Conference on Artificial Intelligence, Aug. 24-28, 1981, pp. 674-679.

Lupton et al., "Visual-inertial-aided Navigation for High-dynamic Motion in Built Environments Without Initial Conditions," IEEE Transactions on Robotics, vol. 28, No. 1, Feb. 2012, pp. 61-76.

Martinelli, "Vision and IMU Data Fusion: Closed-form Solutions for Attitude, Speed, Absolute Scale, and Bias Determination," IEEE Transactions on Robotics, vol. 28, No. 1, Feb. 2012, pp. 44-60.

Matas et al., "Robust Detection of Lines Using the Progressive Probabilistic Hough Transformation," Computer Vision and Image Understanding, vol. 78, No. 1, Apr. 2000, pp. 119-137.

Mclauchlan, "The Variable State Dimension Filter Applied to Surface-Based Structure from Motion CVSSP Technical Report VSSP-TR-4/99," University of Surrey, Department of Electrical Engineering, Dec. 1999, 52 pp.

Meltzer et al., "Edge Descriptors for Robust Wide-baseline Correspondence," Proc. IEEE Conf. Comp. Vision Pall. Recognition., Jun. 23-28, 2008, pp. 1-8.

Mirzaei et al., "A Kalman Filter-based Algorithm for IMU-Camera Calibration: Observability Analysis and Performance Evaluation," IEEE Trans. Robot., vol. 24 No. 5, Oct. 2008, pp. 1143-1156.

Mirzaei et al., "Optimal Estimation of Vanishing Points in a Manhattan World," IEEE Int. Conference on Computer Vision, Nov. 6-13, 2011, pp. 2454-2461.

Mirzaei et al., "Globally Optimal Pose Estimation from Line Correspondences," IEEE International Conference on Robotics and Automation, May 9-13, 2011, pp. 5581-5588.

(56) References Cited

OTHER PUBLICATIONS

Montiel et al., "Unified Inverse Depth Parametrization for Monocular SLAM," Proceedings of Robotics: Science and Systems II (RSS-06), Aug. 16-19, 2006, 8 pp.
Mourikis et al., "On the Treatment of Relative-Pose Measurements for Mobile Robot Localization," IEEE International Conference on Robotics and Automation, Conference Date May 15 -19, 2006, Jun. 26, 2006, 8 pp.
Mourikis et al., "A Dual-Layer Estimator Architecture for Long-term Localization," Proceedings of the Workshop on Visual Localization for Mobile Platforms, Jun. 24-26, 2008, 8 pp.
Mourikis et al., "A Multi-State Constraint Kalman Filter for Vision-aided Inertial Navigation," IEEE International Conference on Robotics and Automation, Apr. 10-14, 2007, pp. 3565-3572.
Mourikis et al., "A Multi-State Constraint Kalman Filter for Vision-aided Inertial Navigation," IEEE International Conference on Robotics and Automation, Sep. 28, 2006, 20 pp.
Mourikis et al., "Vision-Aided Inertial Navigation for Spacecraft Entry, Descent, and Landing," IEEE Transactions on Robotics, vol. 25, No. 2, Apr. 2009, pp. 264-280.
Nerurkar et al., "C-KLAM: Constrained Keyframe-Based Localization and Mapping," Proceedings of the IEEE International Conference on Robotics and Automation, May 31-Jun. 7, 2014, 6 pp.
Nister et al., "Visual Odometry for Ground Vehicle Applications," Journal of Field Robotics, vol. 23, No. 1, Jan. 2006, 35 pp.
Oliensis, "A New Structure from Motion Ambiguity," IEEE Transactions on Pattern Analysis and Machine Intelligence, vol. 22, No. 7, Jul. 2000, 30 pp.
Ong et al., "Six DoF Decentralised SLAM," Proceedings of the Australasian Conference on Robotics and Automation, 2003, 10 pp. (Applicant points out that, in accordance with MPEP 609.04(a), the 2003 year of publication is sufficiently earlier than the effective U.S. filed and any foreign priority date of Apr. 17, 2016 so that the particular month of publication is not in issue.).
Oth et al., "Rolling shutter camera calibration," Proceedings of the IEEE Conference on Computer Vision and Pattern Recognition, Jun. 23-28, 2013, pp. 1360-1367.
Prazenica et al., "Vision-Based Kalman Filtering for Aircraft State Estimation and Structure from Motion," AIAA Guidance, Navigation, and Control Conference and Exhibit, Aug. 15-18, 2005, 13 pp.
Roumeliotis et al., "Augmenting Inertial Navigation With Image-Based Motion Estimation," IEEE International Conference on Robotics and Automation, vol. 4, 2002, 8 pp. (Applicant points out that, in accordance with MPEP 609.04(a), the 2002 year of publication is sufficiently earlier than the effective U.S. filing date and any foreign priority date of Apr. 17, 2016 so that the particular month of publication is not in issue.).
Roumeliotis et al., "Stochastic Cloning: A Generalized Framework for Processing Relative State Measurements," Proceedings of the 2002 IEEE International Conference on Robotics and Automation, May 11-15, 2002, pp. 1788-1795.
Schmid et al., "Automatic Line Matching Across Views," Proceedings of the IEEE Computer Science Conference on Computer Vision and Pattern Recognition, Jun. 17-19, 1997, pp. 666-671.
Servant et al., "Improving Monocular Plane-based Slam with Inertial Measurements," 2010 IEEE/RSJ International Conference on Intelligent Robots and Systems, Oct. 18-22, 2010, pp. 3810-3815.
Shoemake et al., "Animating rotation with quaternion curves," ACM SIGGRAPH Computer Graphics, vol. 19, No. 3, Jul. 22-26, 1985, pp. 245-254.
Sibley et al., "Sliding Window Filter with Application to Planetary Landing," Journal of Field Robotics, vol. 27, No. 5, Sep./Oct. 2010, pp. 587-608.
Smith et al., "On the Representation and Estimation of Spatial Uncertainty," International Journal of Robotics Research, vol. 5(4), 1986, pp. 56-68 (Note: Applicant points out in accordance with MPEP 609.04(a) that the 1986 year of publication is sufficiently earlier than the effective U.S. filed and any foreign priority date of Apr. 17, 2016 so that the particular month of publication is not in issue.).
Smith et al., "Real-time Monocular Slam with Straight Lines," British Machine vision Conference, vol. 1, Sep. 2006, pp. 17-26.
Soatto et al., "Motion Estimation via Dynamic Vision," IEEE Transactions on Automatic Control, vol. 41, No. 3, Mar. 1996, pp. 393-413.
Soatto et al., "Recursive 3-D Visual Motion Estimation Using Subspace Constraints," International Journal of Computer Vision, vol. 22, No. 3, Mar. 1997, pp. 235-259.
Spetsakis et al., "Structure from Motion Using Line Correspondences," International Journal of Computer Vision, vol. 4, No. 3), Jun. 1990, pp. 171-183.
Strelow, D. W., "Motion Estimation from Image and Inertial Measurements", CMU-CS-04-174, (Nov., 2004), 164 pgs.
Taylor et al., "Structure and Motion from Line Segments in Multiple Images," IEEE Transactions on Pattern Analysis and Machine Intelligence, vol. 17, No. 11, Nov. 1995, pp. 1021-1032.
Trawny et al., "Indirect Kalman Filter for 3D Attitude Estimation," University of Minnesota, Department of Computer Science & Engineering, Mars Lab, Mar. 2005, 25 pp.
Triggs et al., "Bundle Adjustment — A Modern Synthesis," Proceedings of the International Workshop on Vision Algorithms: Theory and Practice, Lecture Notes in Computer Science, vol. 1883, Sep. 21-22, 1999, pp. 298-372.
Triggs et al., "Bundle Adjustment—A Modern Synthesis," Vision Algorithms: Theory & Practice, LNCS 1883, Apr. 12, 2002, 71 pp.
Weiss et al., "Real-time Metric State Estimation for Modular Vision-Inertial Systems," Proceedings of the IEEE International Conference on Robotics and Automation, May 9-13, 2011, pp. 4531-4537.
Weiss et al., "Versatile Distributed Pose Estimation and sensor Self-Calibration for an Autonomous MAV," Proceedings of IEEE International Conference on Robotics and Automations, May 14-18, 2012, pp. 31-38.
Weng et al., "Motion and Structure from Line Correspondences: Closed-Form Solution, Uniqueness, and Optimization," IEEE Transactions on Pattern Analysis and Machine Intelligence, vol. 14, No. 3, Mar. 1992, pp. 318-336.
Williams et al., "Feature and Pose Constrained Visual Aided Inertial Navigation for Computationally Constrained Aerial Vehicles," 2011 IEEE International Conference on Robotics and Automation, May 9-13, 2011, pp. 431-438.
Zhou et al., "Determining 3d Relative Transformations for any Combination of Range and Bearing Measurements," IEEE Trans. On Robotics, vol. 29 No. 2, Apr. 2013, pp. 458-474.
Kottas et al., "An Iterative Kalman Smoother for Robust 3D Localization on Mobile and Wearable devices," Submitted confidentially to International Conference on Robotics & Automation, ICRA '15, May 5, 2015, 8 pp.

* cited by examiner ical FIELD

ITERATIVE KALMAN SMOOTHER FOR ROBUST 3D LOCALIZATION FOR VISION-AIDED INERTIAL NAVIGATION

This application claims the benefit of U.S. Provisional Application No. 62/149,194 filed Apr. 17, 2015, the entire contents of which are incorporated herein by reference.

TECHNICAL FIELD

This disclosure relates to navigation devices and, more particularly, to vision-aided inertial navigation.

BACKGROUND

Over the past decade, localization systems fusing inertial data from an inertial measurement unit (IMU) with visual observations from a camera [i.e., vision-aided inertial navigation systems (VINS)] have become a popular choice for GPS-denied navigation (e.g., navigation indoors or in space). Among the methods employed for tracking the six-degrees-of-freedom (d.o.f.) position and orientation (pose) of a device within GPS-denied environments, vision-aided inertial navigation is one of the most prominent, primarily due to its high precision and low cost. During the past decade, VINS have been successfully applied to spacecraft, automotive, and personal localization, demonstrating real-time performance.

In general, each VINS implements an estimator that fuses data from one or more cameras and an Inertial Measurement Unit (IMU) to track the six-degrees-of-freedom (d.o.f.) position and orientation (pose) of the device. In this way, the VINS combines complementary sensing capabilities. For example, the IMU can accurately track dynamic motions over short time durations, while visual data from the image source can be used to estimate the pose displacement (up to scale) between consecutive views. For several reasons, VINS have gained popularity as devices to address GPS-denied navigation.

SUMMARY

In general, this disclosure describes various techniques for use within a vision-aided inertial navigation system (VINS). More specifically, this disclosure presents examples of an Iterative Kalman Smoother (IKS) in which a sliding window-based estimator tracks the 3D motion of a VINS system, such as a mobile device, in real-time using visual and inertial measurements.

In contrast to existing Extended Kalman Filter (EKF)-based approaches, the described IKS can better approximate the underlying nonlinear system and measurement models by re-linearizing them and reprocessing them within the optimization window. Additionally, by iteratively optimizing over all measurements available, examples of the IKS techniques described herein can increase the convergence rate of critical parameters (e.g., IMU-camera clock drift) and improve the positioning accuracy during challenging conditions (e.g., scarcity of visual features). Furthermore, and in contrast to existing inverse filters, the proposed IKS's numerical stability allows for efficient implementations on resource constrained devices, such as cell phones and wearables. The IKS techniques described herein were validated for performing vision-aided inertial navigation on a wearable, computer-enabled glasses with limited sensing and processing, and demonstrated positioning accuracy comparable to that achieved on cell phones. This work presents the first proof-of-concept real-time 3D indoor localization system on a commercial-grade wearable computer.

In additional example implementations, techniques are described in which a sliding-window extended Kalman filter (EKF)-based estimator, such as the IKS, optimizes its use of the available processing resources. This may achieved by first classifying visual observations based on their feature-track length and then assigning different portions of the CPU budget for processing subsets of the observations belonging to each class. Moreover, the estimator utilizes a processing strategy in which "spare" CPU cycles are used for (re)-processing all or a subset of the observations corresponding to the same feature, across multiple, overlapping, sliding windows. This way, feature observations are used by the estimator more than once for improving the state estimates, while consistency is ensured by marginalizing each feature only once (i.e., when it moves outside the camera's field of view).

A vision-aided inertial navigation system comprising at least one image source to produce image data along a trajectory of the vision-aided inertial navigation system (VINS) within an environment, wherein the image data contains a plurality of features observed within the environment at a plurality of poses of the VINS along the trajectory, and an inertial measurement unit (IMU) to produce IMU data indicative of motion of the vision-aided inertial navigation system. The VINS includes a processing unit comprising an estimator that computes, based on the image data and the IMU data, a sliding window of state estimates for at least a position and orientation of the vision-aided inertial navigation system for a plurality of poses of the VINS along the trajectory and respective covariances for each of the state estimates, each of the respective covariances representing an amount of uncertainty in the corresponding state estimate. The estimator computes the state estimates by: classifying the visual features observed at the poses of the VINS within the sliding window into at least a first set of the features and a second set of features as a function of a position within the sliding window for the respective pose from which the respective feature was observed, the second set of features being associated with one or more older poses than the first set of features within the sliding window, applying an extended Kalman filter to update, within the sliding window, each of the state estimates for the VINS and the features using the IMU data and the image data obtained associated with both the first set of features and the second set of features observed from the plurality of poses within the sliding window, and updating, for each of the state estimates, the respective covariance using the IMU data and the image data associated with the second set of features without using the image data associated with the first set of features.

In one embodiment, the invention is directed to a method in comprising receiving image data along a trajectory of the vision-aided inertial navigation system (VINS) within an environment, wherein the image data contains a plurality of features observed within the environment at a plurality of poses of the VINS along the trajectory, receiving inertial measurement data from an inertial measurement unit (IMU) indicative of motion of the vision-aided inertial navigation system, and computing a sliding window of state estimates for a position and orientation of the vision-aided inertial navigation system for a plurality of poses of the VINS along the trajectory with a processing unit comprising an estimator. Computing the state estimates comprises:

classifying the visual features observed at the poses of the VINS within the sliding window into a first set of features and a second set of features as a function of a position within the sliding window for the respective pose from which the respective feature was observed, the second set of features being associated with one or more older poses within the sliding window than the first set of features;

applying an extended Kalman filter to update, within the sliding window, each of the state estimates for the VINS and the features using the IMU data and the image data obtained associated with both the first set of features and the second set of features observed from the plurality of poses within the sliding window, and updating, within the sliding window and for each of the state estimates, the respective covariance using the IMU data and the image data associated with the second set of features without using the IMU data and the image data associated with the first set of features.

In another embodiment, the invention is directed to a computer-readable storage medium containing instructions that cause a programmable processor to implement the methods described herein.

The details of one or more embodiments of the invention are set forth in the accompanying drawings and the description below. Other features, objects, and advantages of the invention will be apparent from the description and drawings, and from the claims.

BRIEF DESCRIPTION OF DRAWINGS

FIG. 9A shows the 3D trajectory. FIG. 9B compares the position error. FIG. 9C compares the speed error. FIG. 9D compares the yaw error.

DETAILED DESCRIPTION

Figure 1:
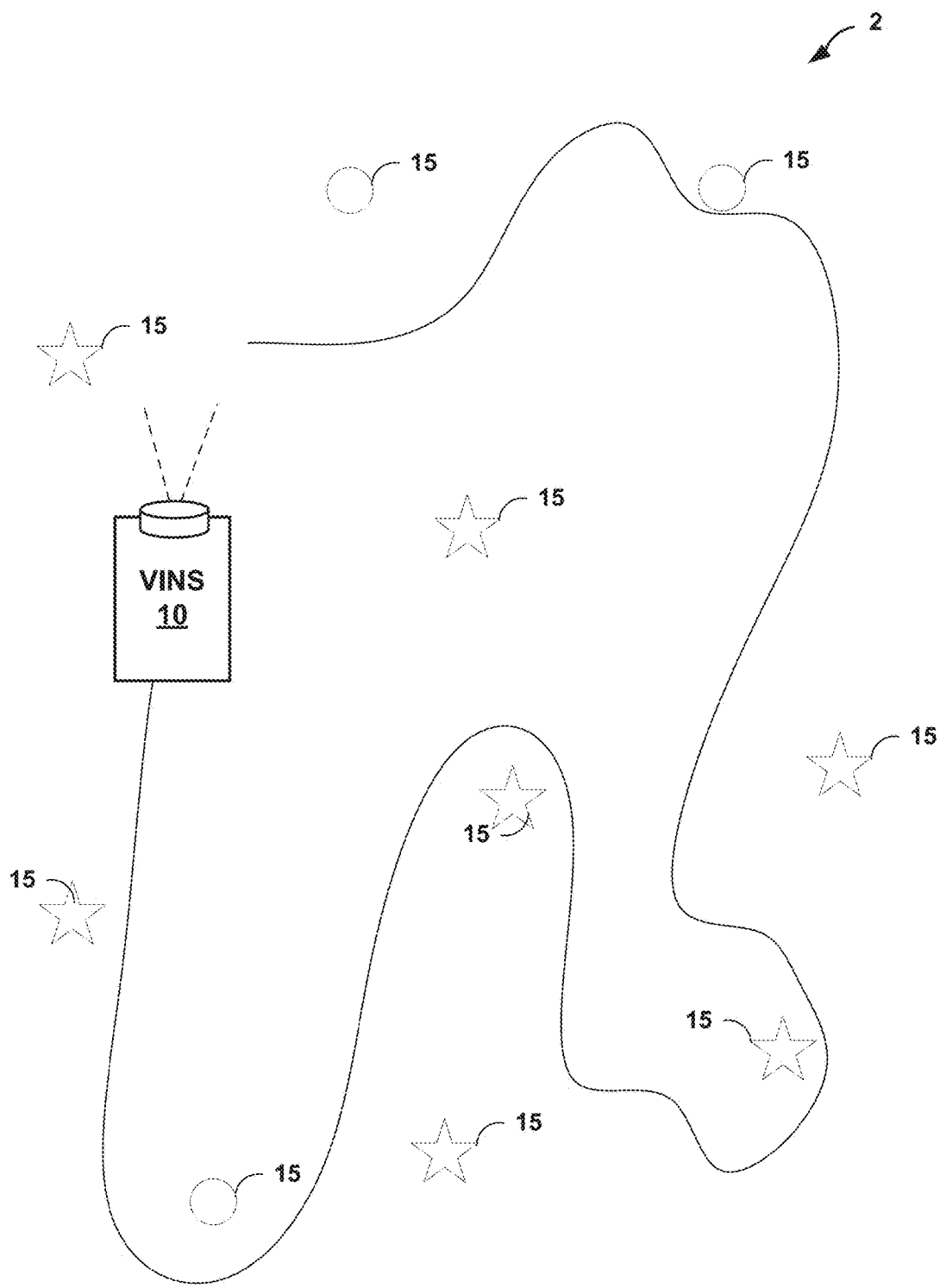
FIG. 1 is a schematic diagram illustrating an example vision-aided inertial navigation system (VINS) performing simultaneous localization and mapping (SLAM) in an example environment according to the techniques described herein.

The dramatic upswing in manufacturing of low-cost, miniature IMUs and cameras, combined with the increasing capabilities of embedded computers, have made mobile devices (e.g., cell phones) potential platforms for VINS, but raised also new challenges, when designing estimators with improved robustness and efficiency characteristics. The Maximum a Posteriori (MAP) estimator for VINS corresponds to a batch least-squares (BLS) problem over the platform's trajectory and the map of the environment. Unfortunately, BLS estimators cannot serve time-critical navigation applications (e.g., augmented reality), due to their unbounded processing and memory requirements, as the problem size increases with time. Other types of estimators for VINS utilize filtering approaches, which maintain bounded processing time by optimizing over a sliding window of the most recent visual and inertial measurements while absorbing past measurements into a prior cost term. Depending on their representation of the prior information, filtering methods can be classified into extended Kalman filters (EKFs) and inverse filters (INVFs).

EKF-based algorithms exhibit excellent numerical stability, and have been demonstrated in real-time VINS implementations. Despite their efficiency, however, current EKF estimators do not allow re-processing the visual and/or inertial measurements within the optimization window, which may severely affect their performance under challenging conditions. Specifically, consider visual observations that arrive as feature tracks spanning a set of images within the estimator's sliding window. Current EKF-based approaches operate in a manner that postpones feature processing until they have reached their maximum length, which causes a delay in the state correction equal to the time between when a feature track is available for processing (i.e., when it spans at least two images) and when it is actually processed. Although this delay may be small (typically less than 2 seconds for personal localization), such delay can affect the accuracy of time-critical navigation systems. Furthermore, under scenarios with increased linearization errors [e.g., (re)-initialization (after failure) of the system's operation, when the available estimates of critical quantities, such as the IMU's velocity and biases, are of low accuracy], re-processing visual and inertial measurements can significantly improve accuracy and robustness by increasing their rate of convergence.

In contrast, an INVF estimator allows re-processing all inertial and visual measurements within the optimization window considered. Unfortunately, due to the high condition number of the Hessian required by INVF estimators, INVF estimators typically require high (e.g., 64-bit or more) precision, reducing their efficiency and limiting potential applications, especially when considering current mobile devices.

This disclosure describes an iterative Kalman smoother (IKS) for robust 3D localization and mapping, using visual and inertial measurements. Contrary to conventional extended Kalman filter (EKF) methods, smoothing achieved by the IKS described herein increases the convergence rate of critical parameters (e.g., IMU's velocity and camera's clock drift), improves the positioning accuracy during challenging conditions (e.g., scarcity of visual features), and allows the immediate processing of visual observations. As opposed to existing smoothing approaches to VINS, based on the inverse filter (INVF), the proposed IKS exhibits superior numerical properties, allowing efficient implementations on mobile devices. Furthermore, we propose a classification of visual observations, for smoothing algorithms applied to VINS, based on their: (i) Track length, allowing their efficient processing as multi-state constraints, when possible and (ii) First observation, allowing their optional re-processing. Finally, we demonstrate the robustness of the proposed approach, over challenging indoor VINS scenarios, including, system (re)-initialization, and scarcity of visual observations.

To overcome the limitations of the EKF and INVF when applied to visual-inertial odometry (VIO), a sliding window iterative Kalman smoother (IKS) is described that achieves advantages of both approaches. In addition, this disclosure extends the most general case for VINS, which allows (re)-processing visual data either using a VIO approach (as in the MSC-KF), or as SLAM landmarks when their track length exceeds the estimator's sliding window. In particular, a sliding window IKS for VINS is described which may provide the following advantages:

The IKS iteratively re-linearizes both inertial and camera measurements within the estimator's window, and re-processes visual data over multiple overlapping sliding window epochs, thus improving robustness and increasing accuracy; and The IKS employs a covariance matrix, as well as a set of linearized constraints (instead of a Hessian matrix) for representing prior information, thus inheriting the superior numerical properties of the EKF and leading to efficient implementations.

This disclosure demonstrates the robustness of the iterative Kalman smoother for robust 3D localization and mapping assess its accuracy in simulations and experiments over challenging indoor VINS scenarios, including, filter initialization and scarcity of feature tracks due to sudden turns or camera occlusions. Finally, the disclosure provides a timing comparison between the IKS and the EKF, using a mobile processor.

FIG. 1 is a block diagram illustrating a vision-aided inertial navigation system (VINS) 10 that navigates an environment 2 having a plurality of features 15 using one or more image sources and inertial measurement unit (IMUs). That is, VINS 10 is one example of a device that utilizes a 3D map of environment 2 to determine the position and orientation of VINS 10 as the VINS traverses the environment, where the map may be constructed in real-time by the VINS or previously constructed. Environment 2 may, for example, represent an environment where conventional GPS-signals are unavailable for navigation, such as on the moon or a different planet or even underwater. As additional examples, environment 2 may represent an indoors environment such as the interior of a building, such as a convention center, shopping mall, sporting arena, business office and the like. Features 15, also referred to as landmarks, represent objects visible within environment 2, such as rocks, trees, signs, walls, stairs, chairs, tables, and the like. Features 15 may be moving or stationary objects within environment 2.

VINS 10 represents any mobile device that implements the techniques described herein. VINS 10 may be, for example, a robot, mobile sensing platform, a mobile phone, a laptop, a tablet computer, a vehicle, and the like. The increasing range of sensing capabilities offered by modern mobile devices, such as cell phones and tables, as well as their increasing computational resources make them ideal for applying VINS. In some implementations, the techniques described herein may be used within environments having GPS or similar signals and may provide supplemental localization and mapping information.

For purposes of example, VINS 10 is shown as an autonomous robot although, as discussed above, VINS 10 may take the form of other devices that implement the techniques described herein. While traversing environment 2, the image sources of VINS 10 produce image data at discrete time instances along the trajectory within the three-dimensional (3D) environment, where the image data captures features 15 within the 3D environment at each of the time instances. In addition, IMUs of VINS 10 produces IMU data indicative of a dynamic motion of VINS 10.

As described in detail herein, VINS 10 includes a hardware-based computing platform that implements an estimator that fuses the image data and the IMU data to perform localization of VINS 10 within environment 10. That is, based on the image data and the IMU data, the estimator of VINS 10 determines, at discrete points along the trajectory of VINS as the VINS traverses environment 2, poses (position and orientation) of VINS 10 as well as positions of features 15 in accordance with mapping information which may be constructed according to the techniques described herein. Utilizing these techniques, VINS 10 may navigate environment 2 and, in some cases, may construct or augment the mapping information for the environment including the positions of features 15.

In one example implementation, the estimator of VINS 10 implements a sliding-window Iterative Kalman Smoother (IKS) for processing inertial and visual measurements and performing localization of the position and orientation of the VINS. The estimator processes image data 14 and IMU data 18 to estimate the 3D IMU pose and velocity together with the time-varying IMU biases and to produce, based on the captured image data, estimates for poses of VINS 10 along the trajectory and, in some cases, a position and orientation within an overall map of the environment.

In contrast to existing Extended Kalman Filter (EKF)-based approaches, the IKS described herein can better approximate the underlying nonlinear system and measurement models by re-linearizing them. Additionally, by iteratively optimizing over all measurements available, the IKS techniques described herein increases the convergence rate of critical parameters (e.g., IMU-camera clock drift) and improves the positioning accuracy during challenging conditions (e.g., scarcity of visual features). Furthermore, and in contrast to existing inverse filters, the proposed IKS's numerical stability allows for efficient implementations on resource constrained devices, such as cell phones and wearables.

Figure 2:
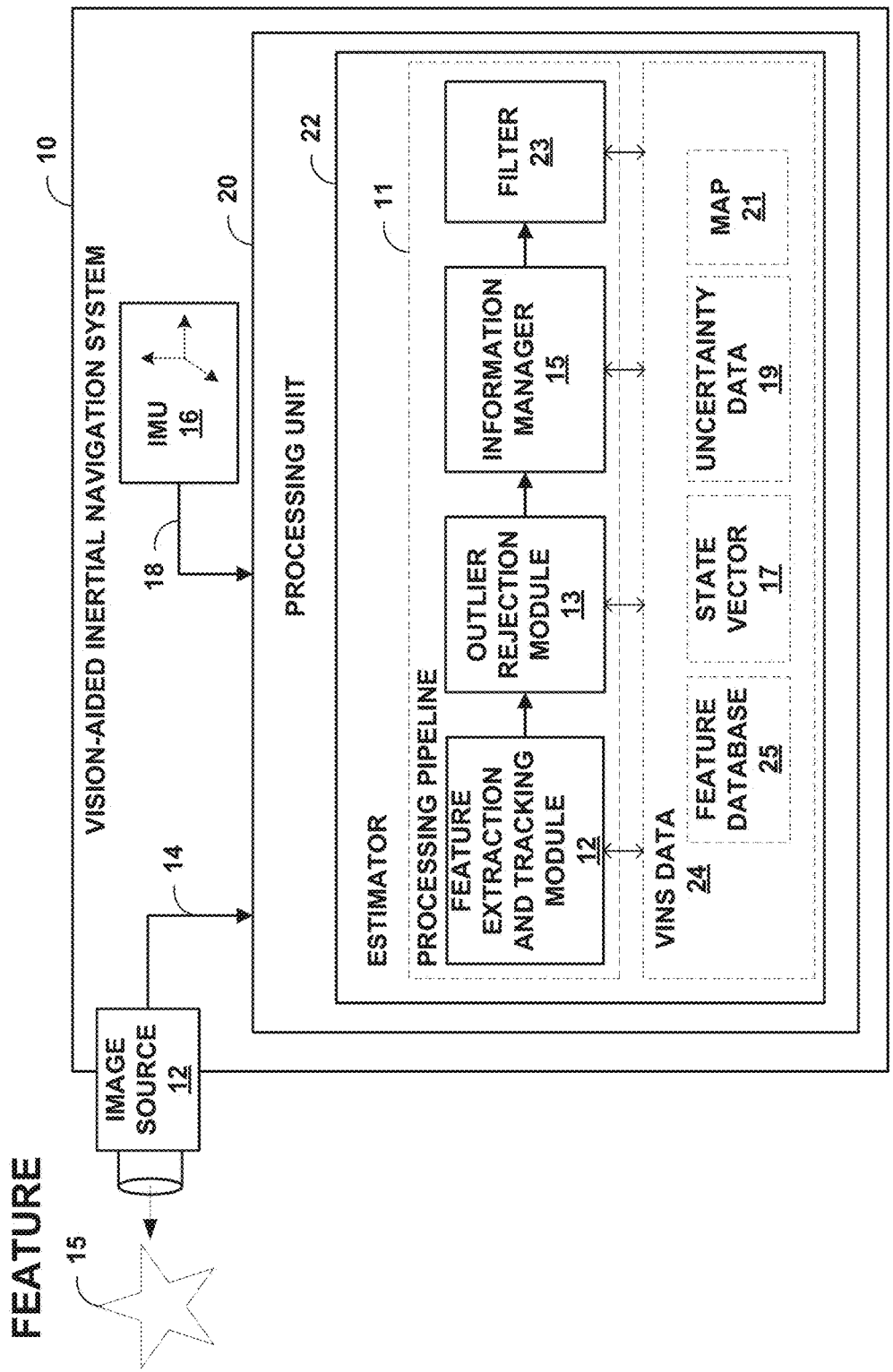
FIG. 2 is a block diagram illustrating a sensor platform comprising an IMU and a camera.

FIG. 2 illustrates an example implementation of VINS 10 in further detail. Image source 12 of VINS 10 images an environment in which VINS 10 operates so as to produce image data 14. That is, image source 12 generates image data 14 that captures a number of features visible in the environment. Image source 12 may be, for example, one or more cameras that capture 2D or 3D images, a laser scanner or other optical device that produces a stream of 1D image data, a depth sensor that produces image data indicative of ranges for features within the environment, a stereo vision system or a vision system with multiple cameras to produce 3D information, a Doppler radar and the like. In this way, image data 14 provides exteroceptive information as to the external environment in which VINS 10 operates. Moreover, image source 12 may capture and produce image data 14 at time intervals in accordance with one or more clocks associated with the image source. In other words, image source 12 may produce image data 14 at each of a first set of time instances along a trajectory within the three-dimensional (3D) environment, wherein the image data captures features 15 within the 3D environment at each of the first time instances.

IMU 16 produces IMU data 18 indicative of a dynamic motion of VINS 10. IMU 16 may, for example, detect a current acceleration using one or more accelerometers as VINS 10 is translated, and detect the rotational velocity (i.e., the rate of change in rotational attributes like pitch, roll, and yaw) using one or more gyroscopes as VINS 10 is rotated. IMU 14 produces IMU data 18 to specify the detected motion. In this way, IMU data 18 provides proprioceptive information as to the VINS 10 own perception of its movement and orientation within the environment. Moreover, IMU 16 may produce IMU data 18 at time intervals in accordance a clock associated with the IMU. In this way, IMU 16 produces IMU data 18 for VINS 10 along the trajectory at a second set of time instances, wherein the IMU data indicates a motion of the VINS along the trajectory. In many cases, IMU 16 may produce IMU data 18 at much faster time intervals than the time intervals at which image source 12 produces image data 14. Moreover, in some cases the time instances for image source 12 and IMU 16 may not be precisely aligned such that a time offset exists between the measurements produced, and such time offset may vary over time. In such cases, VINS 10 may compensate and correct for any misalignment by applying the techniques described in U.S. patent Ser. No. 14/733,468, entitled "EFFICIENT VISION-AIDED INERTIAL NAVIGATION USING A ROLLING-SHUTTER CAMERA WITH INACCURATE TIMESTAMPS," incorporated herein by reference.

In general, estimator 22 fuses image data 14 and IMU data 18 to determine a position and orientation of VINS 10 as well as positions of features 15 as the VINS traverses environment 2. That is, estimator 22 of processing unit 20 process image data 14 and IMU data 18 to compute state estimates for the various degrees of freedom of VINS 10 and, from the state estimates, computes position, orientation, speed, locations of observable features, a map to be used for localization, an odometry or other higher order derivative information represented by VINS data 24. Processing unit 20 may, for example, comprise a hardware-based computing platform having one or more processors that execute software instructions and/or application-specific hardware for implementing the techniques described herein.

In the example of FIG. 2, estimator 22 comprises a processing pipeline 11 for measurements from image source 12 and IMU 16. In this example, processing pipeline 11 includes feature extraction and tracking module 12, outlier rejection module 13, information manager 15 and filter 23.

Feature extraction and tracking module 12 extracts features 15 from image data 14 acquired by image source 12 and stores information describing the features in feature database 25. Feature extraction and tracking module 12 may, for example, perform corner and edge detection to identify features and track features 15 across images using, for example, the Kanade-Lucas-Tomasi (KLT) techniques described in Bruce D. Lucas and Takeo Kanade, *An iterative image registration technique with an application to stereo vision*, In Proc. of the International Joint Conference on Artificial Intelligence, pages 674-679, Vancouver, British Columbia, Aug. 24-28, 1981, the entire content of which in incorporated herein by reference.

Outlier rejection module 13 provides robust outlier rejection of measurements from image source 12 and IMU 16. For example, outlier rejection module may apply a Mahalanobis distance tests to the feature measurements to identify and reject outliers. As one example, outlier rejection module 13 may apply a 2-Point Random sample consensus (RANSAC) technique described in Laurent Kneip, Margarita Chli, and Roland Siegwart, *Robust Real-Time Visual Odometry with a Single Camera and an Imu*, In Proc. of the British Machine Vision Conference, pages 16.1-16.11, Dundee, Scotland, Aug. 29-Sep. 2, 2011, the entire content of which in incorporated herein by reference.

Information manager 15 selects features from feature database 15 and feeds measurements for the selected features to filer 23, which may perform simultaneous localization of the position and orientation for VINS 10 within environment 2 by iteratively optimizing over measurements throughout trajectory, which can be computationally extensive. As described herein, estimator 22 implements filter 23 that iteratively updates predicted state estimates over a bounded-size sliding window of state estimates for poses of VINS 10 and positions of features 15 in real-time as new image data 14 and IMU data 18 are obtained. That is, by implementing the filtering approach, estimator 22 of VINS 10 marginalizes out past state estimates and measurements through the sliding window as VINS 10 traverses environment 2 for simultaneous localization and mapping (SLAM).

In one example implementation, filter 23 of estimator 22 recursively operates on the streams of image data 14 and IMU data 18 to compute a sliding window of predicted estimates for the state variables maintained within state vector 17 along with uncertainty data 19 representing the respective uncertainties in the form of one or more uncertainty matrices, which may take the form of covariance matrices for an extended Kalman filter (EKF). For example, at any time instant, the EKF state 17 vector comprises the evolving IMU state and a history of up to $N_{max}$ past poses of the camera state vector 17 and may take the form of:

$$x = [x_I x_{I_{k+n-1}} \ldots x_{I_k}]$$

where $x_I$ denotes the current pose, and $x_{I_i}$ for $I = k+n-1, \ldots, k$ are the IMU poses in the sliding window, corresponding to the time instants of the last n camera measurements. The current robot pose may be defined as:

$$x_I = [{}^I q_G^T \; {}^G v_I^T \; {}^G p_I^T b_a \; {}^T b_g \; {}^T \lambda_d \lambda_r]^T$$

where ${}^I q_G$ is the quaternion representation of the orientation of $\{G\}$ in the IMU's frame of reference $\{I\}$, ${}^G v_I$ and ${}^G p_I$ are the velocity and position of $\{I\}$ in $\{G\}$ respectively, while $b_a$ and $b_g$ correspond to gyroscope and accelerometer biases.

Estimator 22 may implement filter 23 such that uncertainty data 19 takes the form of a matrix that contains estimates of the uncertainty of each predicted state estimate in state vector 17 as well as a correlation between uncertainties. When a subsequent measurement is observed from either image data 14 or IMU data 18, filter 23 updates the sliding window of predicted state estimates with state vector 17 and the uncertainty data 19 as described herein so as to operate as an iterative Kalman smoother. In general, estimator 22 operates in real-time using the present input measurements of image data 14 and IMU data 18 and the previously calculated state estimates and its uncertainty matrix. In general, when new image data 14 or IMU data 18 is received, filter 23 projects the measurements as the data arrives onto the state estimates within state vector 17 to re-compute the predicted states and to update respective uncertainty data 19 for each state estimate. Any difference between the predicted state estimates as computed by estimator 22 and the actual feature measurements is referred to as a residual.

In some examples, estimator 22 iteratively processes measurements from image data 14 and IMU data 18 to update estimates only keyframes (key robot/device poses) and key landmarks while also exploiting information (e.g., visual observations and odometry measurements) available to the non-keyframes along the trajectory. In such example implementations, filter 23 projects new measurements onto the keyframes, by generating consistent pose (position and orientation) constraints between keyframes. As used herein, the term keyframes refers to the individual poses of the VINS 10 for which position and orientation of the VINS are to be estimated. In contrast, the term non-keyframes refers to intermediate poses between keyframes and for which, in some examples, complete state estimates of the VINS are not computed. In these example implementations, information from non-keyframes, acquired between keyframes, is not discarded. Instead, this information is projected on to estimates in the state vector associated with the keyframes, in order to generate tight constraints between the keyframes. For example, information from a non-keyframe may be projected onto a preceding keyframe to compute relative position and orientation constraints between the preceding keyframe and the non-keyframe. Further examples of such implementations are described in U.S. patent application Ser. No. 14/271,971, entitled "CONSTRAINED KEY FRAME LOCALIZATION AND MAPPING FOR VISION-AIDED INERTIAL NAVIGATION," filed May 7, 2014, the entire contents of which are incorporated herein by reference.

As described herein, rather than apply a conventional extended Kalman filter (EKF), filter 23 of estimator 22 comprises a sliding window iterative Kalman smoother (IKS) for processing inertial and visual measurements to compute, based on the image data and the IMU data, state estimates for at least a position and orientation of VINS 10 for a plurality of poses of the VINS along the trajectory. That is, estimator 22 applies the IKS to process image data 14 and IMU data 18 to update within state vector 17 estimates for the 3D IMU pose and velocity together with the time-varying IMU biases so as to determine the position and orientation of estimator 22 within the environment represented by map 21. Estimator 22 may, in accordance with the techniques described herein, apply estimation techniques that compute state estimates for 3D poses of IMU 16 at each of the first set of time instances associated with capture of the IMU data and 3D poses of image source 12 at each of the second set of time instances associated with capture of the image data along the trajectory.

In this example implementation, estimator 22 initially classifies the features observations into simultaneous localization and mapping (SLAM) features for which estimates are included and updated within an augmented system state vector 17 maintained by estimator 22, and multi-state constraint Kalman filter (MSCKF) features for which the estimator has determined to exclude corresponding estimates in the state vector but instead used the features to generate constraints that geometrically constrain the states for the poses of VINS 10 from which the MSCKF feature was observed. That is, rather than maintain state estimates for positions of each observed feature 15 within its internal state vector, the estimator may group the images per feature and elect to exclude state estimates for one or more of those features (i.e., MSCKF features) from its state vector that were observed from multiple poses along the trajectory. For these features excluded from the state vector, referred to as MSCKF features, estimator 22 computes geometric constraints that constrain state estimates for other poses within the sliding window state vector and that are used to compute state updates for those state estimates within the state vector. In this way, MSCKF features relate and constrain estimated poses within the sliding window. They require less computations than SLAM features since their feature states are not directly estimated. Further example details of an estimator that computes constraints for features 15 observed from multiple poses and utilizes constraints to compute the state estimates for VINS 10 while excluding the MSCKF features from the state vector are described in U.S. patent application Ser. No. 12/383,371, entitled "VISION-AIDED INERTIAL NAVIGATION," the entire contents of which are incorporated herein by reference.

Figure 3A:
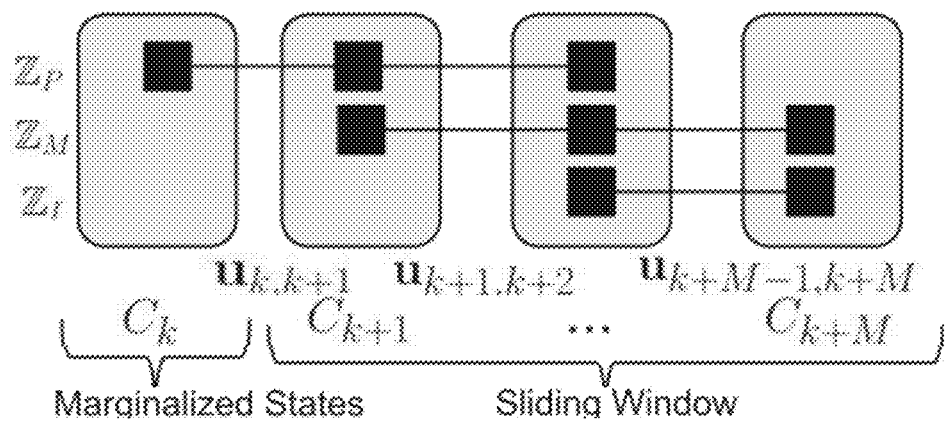
FIG. 3A is a graph illustrating example processing of features by an estimator of FIG. 1 using a sliding window of camera poses and where features are categorized into three categories of feature tracks: (i) ZP: features that were previously absorbed; (ii) $Z_M$: features that have reached their maximum length and are about to be absorbed; and (iii) $Z_f$: feature tracks that entered the estimator's sliding window but have not reached their maximum length.

FIG. 3A is a block diagram illustrating example processing of features by the estimator 22 of VINS 10 of FIGS. 1 and 2 according to a sliding window IKS. In order to process the multi-state constraints provided by visual feature tracks, VINS 10 maintains a sliding window of past camera poses, $x_{k+1:k+M}$. Within an inverse filter (INVF), the same measurements may be available for processing at different time-instants, corresponding to different epochs of the sliding window. In conventional EKF, however, each feature track can be used only once (when it has reached its maximum length) for updating the current state and covariance estimates. In the example of FIG. 3A, feature extraction and tracking module 12 of estimator 22 categorizes each feature into one of three categories of feature tracks:

Past Features ($Z_P$): These correspond to visual observations that were absorbed in a past epoch of the sliding window and cannot be re-processed by any filter.

Mature Features ($Z_M$): These are feature tracks that have reached their maximum length. Both the EKF and the INVF linearize, process, and absorb them at a single step. Note also that the INVF, as well as the Iterative EKF (I-EKF) can re-linearize these observations.

Immature Features ($Z_I$): This set represents feature tracks which have already entered the image-processing pipeline, but have not reached their maximum length, yet. Although the INVF can use (and re-linearize) these measurements multiple times, across overlapping epochs of the sliding window (from the time they are first observed till the track exits the optimization window), the conventional EKF is not able to.

The delay in processing the $Z_I$'s is a major limitation of conventional EKF, which negatively impacts its robustness and accuracy, especially when operating under adverse conditions (e.g., areas with limited number of features). Furthermore, the EKF is unable to re-linearize past IMU measurements, which leads to loss in accuracy due to the accumulation of linearization errors. In contrast, existing INVF-based approaches allow for the re-linearization of all measurements within a sliding window. However, maintaining the Hessian as a representation of prior information in VINS, comes at the expense of numerical instability. Specifically, the Hessian's high condition number (~$10^9$) may not allow a numerically-stable implementation on a 32-bit floating-point unit, thus significantly increasing computational cost due to the required double-precision arithmetic.

In general, conventional EKF's limitations (i.e., delayed processing of $Z_I$'s and inability to re-linearize the inertial measurements) stem from the fact that at each optimization epoch the EKF constructs and uses a prior for the entire sliding window using the inertial measurements. This is necessary for processing feature tracks that may span the entire optimization window. Once the covariance has been updated, it cannot be "rolled back" to a prior, which is required for re-using the inertial measurements in the next epoch. Furthermore, once a feature track has been processed for updating the covariance, it cannot be re-used in the future.

As described herein, both these limitations of the EKF can be addressed by introducing the following two aspects of the described IKS technique applied by estimator 22:
1) Divide the update of the EKF into a two-step process:
   (i) update the state within state vector 17 using all available inertial measurements 18 between poses within the sliding window and visual measurements 14 for all features, and
   (ii) update the covariance uncertainty data 19, using only u_k+1:k+2 inertial measurements between poses at the tail of the sliding window and the feature tracks $Z_M$ that are about to be absorbed, i.e., mature features. This decoupling of the two update processes allows estimator 22 to re-process the same inertial and feature measurements multiple times and hence gain in state estimation accuracy. At the same time, by considering their contribution only once when updating the covariance, estimator 22 may ensure consistency.
2) Define "priors" (representing prior information based on marginalized features that have been absorbed after falling off the tail of the sliding window) as a combination of:
   (i) A "regular" prior, comprising a state estimate and the corresponding covariance matrix, and
   (ii) A set of linearized constraints describing the information available for states whose covariance potentially cannot be initialized. Note that this division of the prior into two parts, and thus two cost terms, is not necessary in the INVF, since it employs the Hessian, which can be formed regardless if the covariance for all the states can be initialized or not (alas, at the expense of a high condition number).

In additional example implementations, estimator 22 may optimize its use of the available processing resources of VINS 10. Estimator 22 may achieve this by first classifying visual observations based on their feature-track length and then assigning different portions of the CPU budget for processing subsets of the observations belonging to each class. Moreover, in this example, estimator 22 utilizes a processing strategy in which "spare" CPU cycles are used for (re)-processing all or a subset of the observations corresponding to the same feature, across multiple, overlapping, sliding windows. This way, feature observations are used by the estimator more than once for improving the state estimates, while consistency is ensured by marginalizing each feature only once (i.e., when it moves outside the camera's field of view).

Figure 3B:
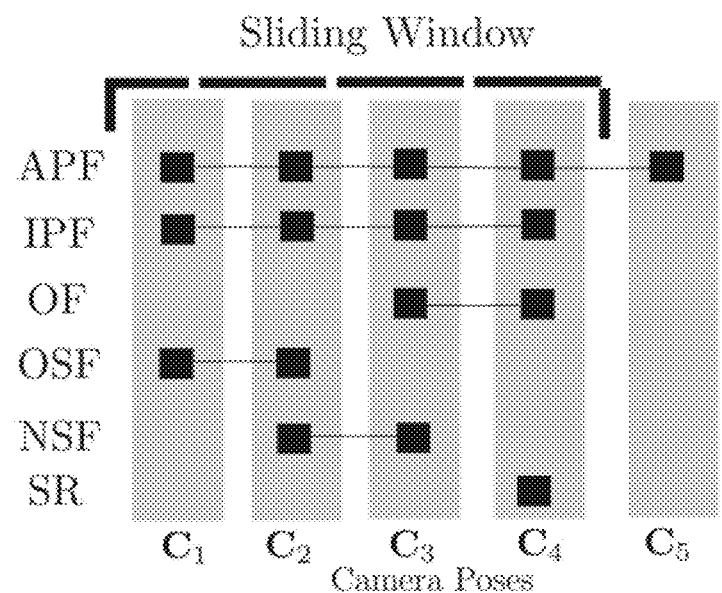
FIG. 3B is a graph illustrating processing of features by an estimator of FIGS. 1-2 according one example of categorization of features based on whether their positions within the sliding window span across the sliding window of camera poses.

FIG. 3B, for example, is a block diagram illustrating processing of features by estimator 22 of FIG. 1 according categorization of features based on their span across the sliding window of camera poses. As shown in FIG. 3B, within a sliding window filtering framework, the same measurement is available for processing at different time instants, during different epochs of the sliding window of camera poses. Following the traditional EKF framework, such a feature track can be employed only in a single update for correcting the state estimate and reducing its covariance. For existing Vision-aided Inertial Odometry (VIO) algorithms, a feature track is processed only once, when it has reached its maximum tracking length. In practice, this will cause a depletion of features available for an EKF update, leading to low performance.

In order to process any feature track spanning at least two poses of our sliding window, in certain examples, estimator 22 may apply an estimation process that utilizes state-only EKF updates. For example, among the different sliding window epochs, corresponding to different EKF updates, estimator 22 chooses only one for "absorbing" the feature track's information in the filter's covariance matrix (i.e., marginalization when the feature track is lost), while still be able to correct state estimate during all state updates, up to that point.

In the example of FIG. 3B, estimator 22 classifies feature tracks observed from poses within the sliding window into six disjoin sets:
1. SLAM re-observations (SRs) denoted by SR, correspond to observations of features being mapped.
2. Active Persistent Features (APFs) denoted by APF, correspond to feature tracks that span the whole window of camera poses and are actively tracked beyond the size of the current sliding window. Such features have currently reached their maximum length. Hence they are the most informative regarding the motion of the camera poses, and they can also be initialized as new SLAM features such that they evolve to SRs.
3. Inactive Persistent Features (IPFs) denoted by IPF, correspond to feature tracks that span the whole window of camera poses, but are not tracked beyond the size of the current sliding window.
4. Old Short Features (OSFs), denoted by OSF, correspond to feature tracks that start from the oldest image but do not reach the newest (most recent) camera pose.
5. Opportunistic Features (OFs) denoted by FOF, correspond to feature tracks that do not start from the oldest camera pose but are observed in the newest image. Such features have not yet reached their maximum potential tracking length, and may evolve to PFs.
6. New Short Features (NSFs), denoted by NSF, correspond to feature tracks that do not start from the oldest image and do not reach the newest image.

During processing, estimator 22 applies policies to determine when and how to process a feature track given the current processing constraints. That is, estimator 22 applies a measurement selection policy for deciding, which measurements will be processed based on the available computational resources. For example, estimator 22 may apply an estimation policy that examine the available feature tracks and assigns each of them to one of four available groups, after checking that the projected computational cost does not exceed an allocated total CPU budget for the current EKF update. Although described herein with respect to an Iterative Kalman Smoother (IKS), these techniques providing a resource-aware VINS may be applied to other sliding-window-based VINS estimators.

Figure 4:
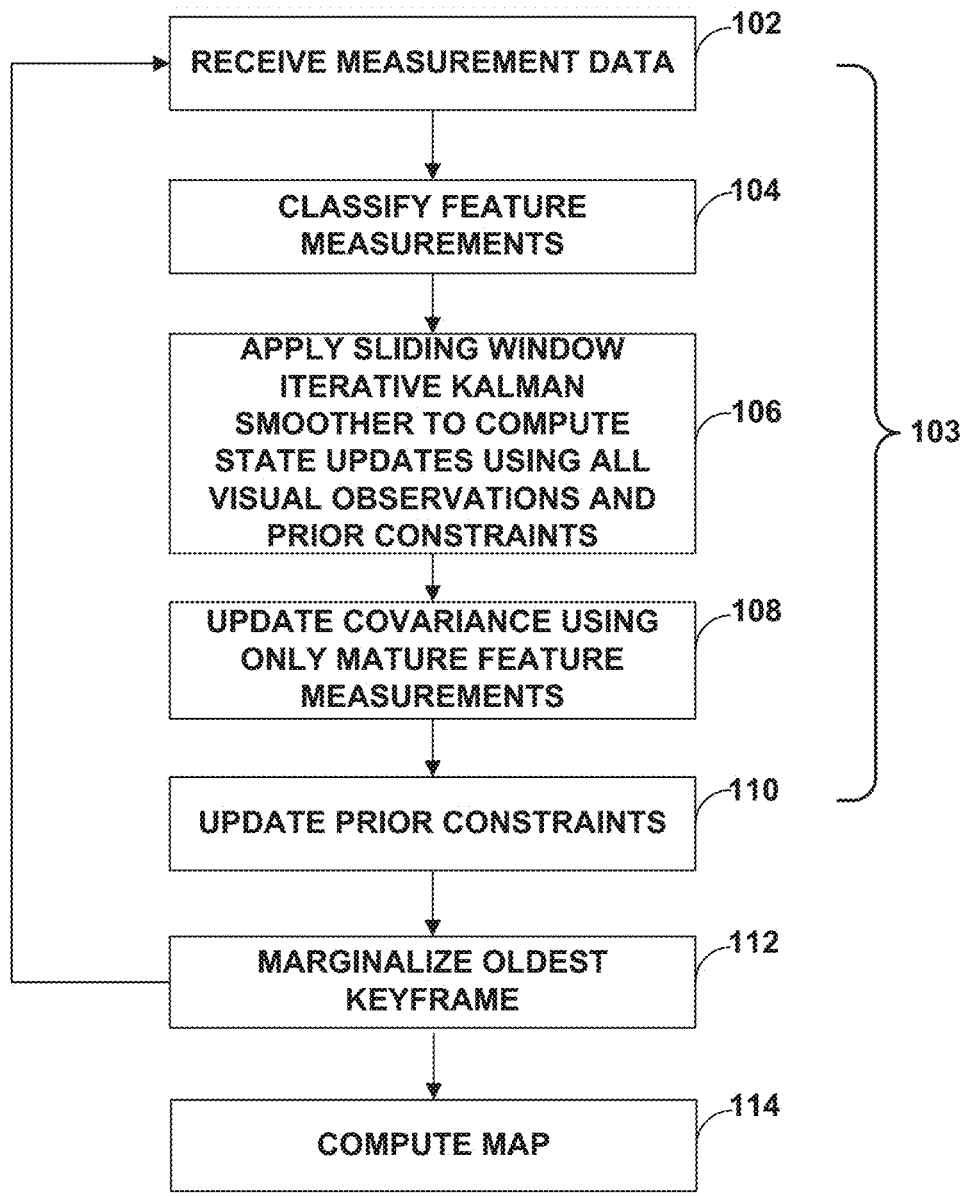
FIG. 4 is a flowchart illustrating example operation of a device in accordance with the techniques described herein.

FIG. 4 is a flowchart illustrating example operation of estimator 22 in accordance with the techniques described herein. The device may, for example, comprise a vision-aided inertial navigation system, mobile device, laptop, table, robot, vehicle, server, cloud-based processing system or other device having a processor or other operating environment for implementing the techniques described herein. For purposes of explanation, FIG. 3 will be described with respect to VINS 10 and estimator 22 of FIG. 1.

During operation, estimator 22 receives measurement data observed along the trajectory (100). That is, estimator 22 receives image data 14 produced by an image source 12 of the vision-aided inertial navigation system 10 for keyframes and non-keyframes along a trajectory of the VINS. In addition, estimator 22 receives, from an inertial measurement unit (IMU) 16, IMU data 18 indicative of motion of VINS 10 along the trajectory for the keyframes and the one or more non-keyframes. In this way, VINS 10 receives and records, within VINS data 24, image data 14 and IMU data 18 for keyframes and non-keyframes along the trajectory. Each keyframe and non-keyframe may correspond to a pose (position and orientation) of VINS 10 including landmarks observed within the environment at that pose. In general, the term keyframes refers to the individual poses of the VINS for which position and orientation of the VINS are to be estimated. In contrast, the term non-keyframes refers to intermediate poses between keyframes and for which complete state estimates of the VINS are not computed. Further example details are described in U.S. patent application Ser. No. 14/271,971, entitled "CONSTRAINED KEY FRAME LOCALIZATION AND MAPPING FOR VISION-AIDED INERTIAL NAVIGATION," the entire contents of which are incorporated herein by reference.

Based on the sliding window of image data and IMU data, estimator 22 applies an extended Kalman filter to iteratively update a state vector to determine state estimates (linearization points) for each pose of the VINS and each landmark (103). For example, estimator 22 may update a state vector to compute state estimates for the position and the orientation of the VINS and for one or more landmarks observed from the VINS at various poses along the trajectory. In an example implementation, the state vector includes state estimates (quantities being estimated) for at least a position and orientation of the vision-aided inertial navigation system for a plurality of poses of the VINS along the trajectory. Along with the state vector, the iterative Kalman smoother estimates a respective covariance for each of the state estimates, where the respective covariance represents the amount of uncertainty in the corresponding state estimate.

As described herein, estimator 22 processes all inertial and visual observations for a current time epoch of the sliding window using an iterative Kalman smoother such that for future epochs the estimator can reprocess all of the measurements that are independent of the sliding window's "tail" state and immature feature tracks.

For example, as shown in FIG. 3, estimator 22 classifies the visual feature measurements observed at each of the poses of the VINS within the sliding window into a set of the mature features and a set of the immature features based on a position within the sliding window for the respective pose from which the features were observed (104). For example, those features that were observed from an oldest camera pose(s), i.e., keyframe(s), that is about to be marginalized and dropped from the sliding window are classified as mature features. The remaining features are classified as immature features.

Next, filter 23 of estimator 22 applies an EKF update to update, within the sliding window, each of the state estimates for the VINS and for the features using the IMU data captured throughout the sliding window and the image data obtained at the plurality of poses within the sliding window (106). For example, estimator 22 applies the IKS to perform an EKF update to recompute, based on the sliding window of data, the state estimates for the VINS and for the positions of the features with the environment, as represented within the state vector, using (1) all of the IMU data and the image data associated with features observed at any of the plurality of poses within the sliding window, and (2) a set of prior constraints linearly constraining the state estimates for the poses associated with the immature features to the state estimates associated with the mature features. In some examples, estimator 22 utilizes features associated with all poses within the sliding window. In other examples, estimator 22 may utilizes the budgeting techniques described herein to apply an estimation policy for deciding, which measurements will be processed based on the available computational resources the current EKF update.

Next, estimator 22 updates, for each of the state estimates, the respective covariance of uncertainty data using: (a) the constraints and (b) the image data associated with the mature features and the IMU data that have reached an end of the sliding window and are about to be absorbed without using the image data associated with the immature features or IMU data measured more recently within the sliding window (108). In addition, estimator 22 computes updates for the set of prior constraints to be used in the next iteration (110) and marginalizes the oldest keyframe by absorbing the keyframe into the prior of the estimator (112). That this, estimator 22 discards the oldest keyframe from the sliding window and adds a new one to the image processing pipeline.

Based on the computed state estimates, estimator 22 may construct a map, e.g., a 2D or 3D map, of the environment (114). The map may, for example, include position and orientation information for the VINS along the trajectory relative to position information for any landmarks observed by the VINS. The map may be displayed, stored, used for subsequent navigation and the like.

The following sections describe detailed example implementation of vision-aided inertial navigation system (VINS) 10. The system state at time $t_k$ is given by $x_k = [x_{I_k}^T \; ^{I_k}l_k^T]^T$ where $x_{I_k}$ contains all kinematic quantities, describing the motion of the IMU's frame of reference $\{I_k\}$, while $^{I_k}l_k$ comprises landmarks of the environment. In particular, $x_{I_k} = [^{I_k}q_G^T \; ^G p_{I_k}^T \; ^G v_{I_k}^T \; b_{a_k}^T \; b_{g_k}^T]^T$, where $^{I_k}q_G$ is the quaternion representation of the orientation of the global frame $\{G\}$ in $\{I_k\}$, $^G v_{I_k}$ and $^G p_{I_k}$ are the velocity and position of $\{I_k\}$ in $\{G\}$ respectively, while $b_{a_k}$ and $b_{g_k}$ correspond to the gyroscope and accelerometer biases. Finally, $^{I_k}l_k$ comprises $N_k$ landmarks, i.e., $^{I_k}l_k = [^{I_k}f_1^T \ldots ^{I_k}f_{N_k}^T]^T$ where $^{I_k}f_j^T$ denotes the inverse-depth parameterization of feature $f_j$ in $\{I_l\}$.

IMU 16 provides measurements 18 of the platform's rotational velocity and linear acceleration, contaminated by white Gaussian noise and time-varying biases. Let $u_{k,k+1}$ denote the inertial measurements within the time interval $[t_k, t_{k+1}]$, which through integration, define a constraint (discrete-time process model) of the form:

$$x_{I_{k+1}} = f(x_{I_k}, u_{k,k+1} - w_{k,k+1}) \qquad (1)$$

where $w_{k,k+1}$ is a discrete-time zero-mean white Gaussian noise process with covariance $Q_k$. Linearizing (1), at the state estimates corresponding to the two consecutive states, $x^*_{I_k}$, $x^*_{I_{k+1}}$, results in the following IMU measurement model, relating the error states $\tilde{x}^*_{I_k}$, $\tilde{x}^*_{I_{k+1}}$:

$$\tilde{x}^*_{I_{k+1}} = r^*_{u_{k,k+1}} + \Phi^*_{k+1,k} \tilde{x}^*_{I_k} + G^*_{k+1,k} w_{k,k+1} \qquad (2)$$

where $r^*_{u_{k,k+1}} := f(\tilde{x}^*_{I_k}, u_{k,k+1}) - x^*_{I_{k+1}}$, and we have defined the error state $\tilde{x}^*_{I_k}$ as the difference between the true state $x_{I_k}$ and the linearization point $x^*_{I_k}$ (i.e., $\tilde{x}^*_{I_k} = x_{I_k} - x^*_{I_k}$). The Jacobians $\Phi^*_{k+1,k}$ and $G^*_{k+1,k}$ are evaluated at $x^*_{I_k}$, $x^*_{I_{k+1}}$, and are available in numerical or analytical form [1]. Although the corresponding cost term, $$c_{u_{k,k+1}}(\tilde{x}^*_{k:k+1}) = \left\| r^*_{u_{k,k+1}} - [-\Phi^*_{k+1,k} \; I] \begin{bmatrix} \tilde{x}^*_k \\ \tilde{x}^*_{k+1} \end{bmatrix} \right\|^2_{Q^*_k}$$

where $\tilde{x}^*_{k:k+1} := [\tilde{x}^{*T}_{I_k} \tilde{x}^{*T}_{I_{k+1}}]^T$ and $Q^*_k = G^*_{k+1,k} Q_k G^{*T}_{k+1,k}$, can be re-linearized multiple times within the INVF framework, current EKF-based approaches linearize (1) only once, during state and covariance propagation (i.e., every time a new inertial measurement becomes available). This limitation may negatively affect performance when the linearization errors are large (e.g., during system initialization).

Figure 5:
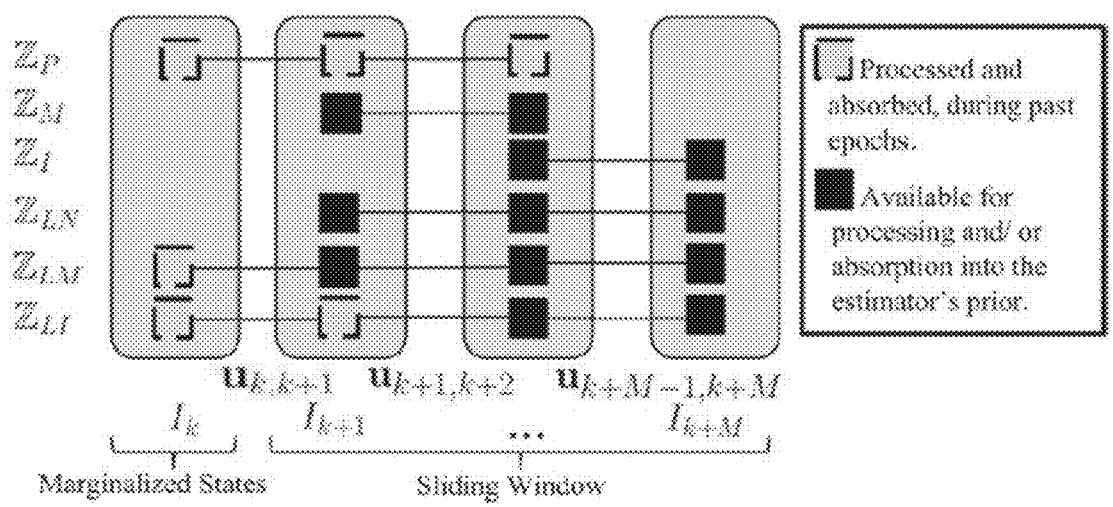
FIG. 5 provides a detailed example of feature tracks that may be generated from an image-processing pipeline of the estimator.

FIG. 5 provides a more detailed example of feature tracks that may be generated from image-processing pipeline 11 of estimator 22. As described above, a feature-tracking pipeline may be utilized to extract and track feature information from image data 14 provided by image source 12. Once a new image arrives, point features from the previous image, are tracked to the new one, while new features are extracted from areas that just entered the camera's field of view. In the example of FIG. 5, at $t_{k+M}$, there exist six categories of feature tracks by estimator 22, as described in further detail below.

Consider a point feature $f_j$, observed in camera poses $x_{I_{k+1:k+N_j}}$, where $N_j \leq M$ and $M$ is the window's length. We represent $f_j$ using its homogeneous coordinates and inverse distance in $\{I_{k+1}\}$, hereafter denoted by $^{I_{k+1}}f_j$, or using its Cartesian coordinates, $^{I_{k+1}}p_{f_j}$. For the m-th measurement, $m \in [1, \ldots, N_j]$, the observation $z_{k+m,j}$ acquired by a calibrated camera is:

$$z_{k+m,j} = \pi(C(^{I_{k+m}}q_{I_{k+1}})^{I_{k+1}}p_{f_j} + ^{I_{k+m}}p_{I_{k+1}}) + n_{k+m,j} \quad (3)$$

where $$\pi([x\ y\ z]^T) = \left[\frac{x}{z}\ \frac{y}{z}\right]^T,$$

while $n_{k+m,j} \sim \mathcal{N}(0, \sigma^2 I_2)$, and $I_2$ is the 2×2 identity matrix. Linearizing (3), yields:

$$\tilde{z}^*_{k+m,j} = H^*_{R,k+1,j} \tilde{x}^*_{I_{k+1}} + H^*_{R,k+m,j} \tilde{x}^*_{I_{k+m}} + F^*_{k+m,j}\,{}^{I_{k+1}}\tilde{f}^*_j + n_{k+m,j}$$

Collecting all $N_j$ observations of feature $f_j$ in one vector, yields:

$$\tilde{z}^*_j = H^*_{R,j} \tilde{x}^*_{I_{k+1:k+N_j}} + F^*_j\,{}^{I_{k+1}}\tilde{f}^*_j + n_j \quad (4)$$

which corresponds to the cost term:

$$C_{z_{f_j}}\!\left(\tilde{x}^*_{I_{k+1:k+N_j}}, {}^{I_{k+1}}\tilde{f}_j\right) = \left\|\tilde{z}^*_j - H^*_{R,j}\tilde{x}^*_{I_{k+1:k+N_j}} - F^*_j\,{}^{I_{k+1}}\tilde{f}_j\right\|^2_{\sigma^2 I} \quad (5)$$

Consider an orthonormal matrix $\Theta_j$, partitioned as $\Theta_j = [S_j U_j]$, where the 3 columns of $S_j$ span the column space of $F^*_j$, while the $2N_j - 3$ columns of $U_j$, its left null space. Projecting (4) onto $\Theta_j$, partitions $$C_{z_{f_j}}$$

into two parts:

$$C_{z_{f_j}}\!\left(\tilde{x}^*_{I_{k+1:k+N_j}}, {}^{I_{k+1}}\tilde{f}_j\right) = \quad (6)$$

-continued $$\left\|\Theta_j^T\!\left(\tilde{z}^*_j - H^*_{R,j}\tilde{x}^*_{I_{k+1:k+N_j}} - F^*_j\,{}^{I_{k+1}}\tilde{f}_j\right)\right\|^2_{\sigma^2 I_{2N_j}} =$$

$$\left\|r^{K*}_j - H^{K*}_j \tilde{x}^*_{I_{k+1:k+N_j}}\right\|^2_{\sigma^2 I_{2N_j-3}} +$$

$$\left\|r^{M*}_j - H^{M*}_j \tilde{x}^*_{I_{k+1:k+N_j}} - R^{M*}_j\,{}^{I_{k+1}}\tilde{f}_j\right\|^2_{\sigma^2 I_3} =$$

$$C^K_{z_{f_j}}\!\left(\tilde{x}^*_{I_{k+1:k+N_j}}\right) + C^M_{z_{f_j}}\!\left(\tilde{x}^*_{I_{k+1:k+N_j}}, {}^{I_{k+1}}\tilde{f}_j\right)$$

with $r^{K*}_j = U_j^T \tilde{z}^*_j$, $H^{K*}_j = U_j^T H^*_{R,j}$, and $r^{M*}_j = S_j^T \tilde{z}^*_j$, $H^{M*}_j = S_j^T H^*_{R,j}$, $R^{M*}_j = S_j^T F^*_{R,j}$. The second term, $$C^M_{z_{f_j}}$$

contains all information regarding feature $f_j$, while $$C^K_{z_{f_j}}$$

defines a multi-state constraint only among the poses $$x_{I_{k+1:k+N_j}}.$$

For feature tracks that do not exceed the estimator's window, as in the MSC-KF, we consider only the cost term $$C^K_{z_{f_j}}.$$

Specifically, since $R^{M*}_j$ is an invertible square matrix and for any $$\tilde{x}^*_{I_{k+1:k+N_j}}$$

there exists a $^{I_{k+1}}\tilde{f}_j$, such that $$C^M_{z_{f_j}}$$

is exactly zero, minimizing (6) is equivalent to minimizing $$C^K_{z_{f_j}}(\tilde{x}^*_{I_{k+1:k+N_j}}).$$

As we describe later on, for feature tracks whose span exceeds the sliding window (i.e., SLAM landmarks), $$C^M_{z_{f_j}}$$

allows initializing them into the estimator's map, and subsequently optimizing their measurements across non-overlapping epochs of the sliding window.

The following sections describe visual observations in the sliding-window estimator 22. In this example, estimator 22 classifies visual observations, in sliding-window estimators, based on their:

i) Track length which distinguishes SLAM landmarks from MSC-KF features, since for the latter, their track length does not exceed the estimator's window. Thus, optimizing over the MSC-KF feature's coordinates is not required for minimizing their corresponding cost terms [see (6)].

ii) Earliest observation which if it involves the sliding window's "tail" (oldest) state, it does not allow postponing their absorption into the estimator's prior. In particular, estimator 22 may, in this example, distinguish the following categories of visual observations:

Past features ($\mathbb{Z}_p$) corresponding to visual observations that were absorbed in a past epoch of the sliding window and cannot be re-processed by any filter.

MSC-KF features whose tracking length does not exceed the estimator's window, i.e., $N_j \leq M$, hence they are not mapped but rather used only for providing multi-state constraints involving the camera poses observing them. Based on their earliest observation, we further classify MSC-KF features into 2 sets:

Mature features ($\mathbb{Z}_M$): These are MSC-KF features that have reached their maximum length. Both the EKF and the INVF linearize, process, and absorb them in a single step. Note also that the INVF, as well as the Iterative EKF (I-EKF) [4] can re-linearize these observations.

Immature features ($\mathbb{Z}_I$): This set represents feature tracks that have already entered the image-processing pipeline, but have not reached their maximum length, yet. Although the INVF can use (and re-linearize) these measurements multiple times, across overlapping epochs of the sliding window (from the second time they are observed till the track exits the optimization window), the EKF is not able to do so. This limitation introduces a delay, between the "birth" of a feature track and its impact on the filter's state estimates; a potential drawback of EKF-based approaches for time-critical applications.

SLAM landmarks corresponding to features, whose track length exceeds the estimator's optimization window, i.e., $N_j > M$, and hence their optimal processing requires including them into the estimator's map of the environment, $$I_{k+1} f_{K+M}.$$

Within a single epoch of the sliding window, observations to SLAM landmarks can be partitioned into 3 categories:

Mature landmarks ($\mathbb{Z}_{LM}$): These are observations to previously initialized SLAM landmarks, which include the estimator's "tail" pose, hence their absorption into the estimator's prior, cannot be postponed for future epochs of the sliding window.

Immature landmarks ($\mathbb{Z}_{LI}$): These correspond to measurements of previously initialized SLAM landmarks, which do not involve the estimator's "tail" pose, thus their absorption can be postponed to later epochs, till one of them includes the estimator's "tail" pose, i.e., they become mature landmarks.

New SLAM landmarks ($\mathbb{Z}_{LN}$): These are feature tracks that have not yet reached their maximum length, while their present observations span all cameras within the estimator's optimization window. Hence, they will be processed, absorbed, and initialized as new landmarks in the estimator's map.

The following sections describe an example implementation of the estimation algorithm performed by estimator 22. In general, estimator 22: (i) Process all inertial and visual observations within the current epoch of the sliding window $$x_{I_{k+1}: k+N_j}$$

(i.e., inertial measurements $\{u_{l,l+1}\}$, for $k+1 \leq l \leq k+M-1$, and feature tracks $\mathbb{Z}_{LM}, \mathbb{Z}_{LI}, \mathbb{Z}_{LN}, \mathbb{Z}_M$ and $\mathbb{Z}_I$), and (ii) Allows future epochs to re-process all measurements that are independent of the sliding window's "tail" state $x_{I_{k+1}}$ (i.e., the inertial measurements $\{u_{l,l+1}\}$, for $k+2 \leq l \leq k+M-1$, and visual observations to immature MSC-KF features and SLAM landmarks (i.e., $\mathbb{Z}_I$ and $\mathbb{Z}_{LI}$, respectively).

IKS Algorithm: Input.

Before image k+M arrives, the proposed IKS maintains:

1) A set of linearization points, over the estimator's sliding-window of camera poses $x^*_{I_{k+1}:k+M-1}$, and landmarks $^{I_{k+1}}l^*_{k+M-1}$ that represent the estimator's best estimates given all measurements up to $t_{k+M-1}$.

2) A prior comprising:

(a) The pdf of the oldest state, $x_{I_{k+1}}$, within the sliding window approximated as a Gaussian $\mathcal{N}(\hat{x}_{I_{k+1}}^\ominus, P_{I_{k+1}}^\ominus)$.

(b) A set of $N_L$ linearized constraints relating the oldest state, $x^*_{I_{k+1}}$, with the rest of the poses within the sliding window, expressed as:

$$r^*_L{}^\ominus = H^*_L{}^\ominus \tilde{x}^*_{I_{k+1}:k+M-1} + n_L, n_L \sim \mathcal{N}(0, \sigma^2 I_{N_L}). \quad (7)$$

(c) A set of $3N_{k+M-1}$ linearized constraints relating the oldest state, $x^*_{I_{k+1}}$, with the rest of the poses within the sliding window and the SLAM landmarks $^{I_{k+1}}l_{k+M-1}$ expressed as:

$$r^*_M{}^\ominus = H^*_M{}^\ominus \tilde{x}^*_{I_{k+1}:k+M-1} + F^*_M{}^\ominus {}^{I_{k+1}}\tilde{l}^*_{k+M-1} + n_M,$$
$$n_M \sim \mathcal{N}(0, \sigma^2 I_{3N_{k+M}}). \quad (8)$$

The ensemble of the pdf $\mathcal{N}(\hat{x}_{I_{k+1}}^\ominus, P_{I_{k+1}}^\ominus)$ and the linearized constraints $\{r^*_L{}^\ominus, H^*_L{}^\ominus\}$ and $\{r^*_M{}^\ominus, H^*_M{}^\ominus, F^*_M{}^\ominus\}$ in (7) and (8) represent all information for the poses $x_{I_{k+1}:k+M-1}$ and the landmarks $^{I_{k+1}}l^*_{k+M-1}$, accumulated through absorption of past visual observations (i.e., $\mathbb{Z}_p$ in FIG. 1) and inertial measurements (i.e., $\{u_{l,l+1}, l \leq k\}$).

IKS Example Algorithm: Overview.

In this example, a single recursion of the IKS performed by estimator 22 involves the following steps:

1. Propagation: The prior pdf, $\mathcal{N}(\hat{x}_{I_{k+1}}^\ominus, P_{I_{k+1}}^\ominus)$, of $x_{I_{k+1}}$ and the inertial measurements $\{u_{l,l+1}\}$, for $k+1 \leq l \leq k+M-1$ are used for creating a prior $\mathcal{N}(\hat{x}_{I_{k+1}:k+M}^\ominus, P_{I_{k+1}:k+M}^\ominus)$ for all the poses within the sliding window.

2. State Update: All available feature tracks, either from SLAM landmarks, i.e., $\mathbb{Z}_{LM}, \mathbb{Z}_{LN}$ and $\mathbb{Z}_{LI}$, and MSC-KF features, i.e., $\mathbb{Z}_M$ and $\mathbb{Z}_I$, as well as the prior constraints $\{r^*_L{}^\ominus, H^*_L{}^\ominus\}$ and $\{r^*_M{}^\ominus, H^*_M{}^\ominus, F^*_M{}^\ominus\}$ are processed for updating the current state estimates $x^*_{I_{k+1}:k+M}$. This state-optimization can be performed iteratively.

3. Landmark Propagation: All landmarks are propagated to the next "tail" of the sliding window, $x_{I_{k+1}}$, i.e., $^{I_{k+2}}l_{k+M} = [^{I_{k+2}}f_1^T \ldots {}^{I_{k+2}}f_{N_{k+M}}^T]^T$.

4. Covariance Update: The measurements, $\mathbb{Z}_{LM}$, $\mathbb{Z}_{LN}$, $\mathbb{Z}_M$, and $u_{k+1,k+2}$, which are about to be absorbed, are used to compute the posterior covariance $P_{I_{k+2}}^{\oplus}$ of $x_{I_{k+2}}$, which will become the new "tail" of the sliding window.

5. Construction of the next epoch's prior constraints: The prior constraints $\{r^*_L{}^{\ominus}, H^*_L{}^{\ominus}\}$ and $\{r^*_M{}^{\ominus}, H^*_M{}^{\ominus}, F^*_M{}^{\ominus}\}$ are updated so that they become independent of the state to be marginalized, $x_{I_{k+1}}$, and instead reflect the new constraints between $x_{I_{k+2}}$, $x_{I_{k+3:k+M}}$ and ${}^{I_{k+2}}l_{k+M}$.

IKS Algorithm: Detailed Example Description.

In order to allow for a direct comparison with the INVF and the EKF, the following sections provide a two-level description of the IKS: the effect that each step has on the cost function being minimized is first described and then the corresponding IKS equations are presented.

The IKS (iteratively) minimizes the cost function:

$$c_{M+k}(\tilde{x}^*_{I_{k+1:k+M}}, {}^{I_{k+1}}\tilde{l}^*_{k+M}) = c_{P_{I_{k+1}}^{\ominus}} + c_u + c_L + c_{z_M}^K + \quad (9)$$
$$c_{z_I}^K + c_{z_{LM}}^K + c_{z_{LI}}^K + c_{z_{LN}}^K + c_M + c_{z_{LM}}^M + c_{z_{LI}}^M + c_{z_{LN}}^M$$

where $$c_{P_{I_{k+1}}^{\ominus}}$$

corresponds to the prior pdf of the oldest state within the sliding window, $x_{k+1}$, $c_u = \sum_{l=k+1}^{k+M-1} c_{u_{l,l+1}}$ to the inertial measurements $u_{k+1:k+M}$ [see (2)] $c_L$ to prior information about the poses $x_{k+1:k+M-1}$ [see (7)], $c_{z_M}^K$, $c_{z_I}^K$, $c_{z_{LM}}^K$, $c_{z_{LI}}^K$ and $c_{z_{LN}}^K$ to geometric constraints between the poses from all available visual observations [see (6)], $c_M$ to prior information about the SLAM landmarks ${}^{I_{k+1}}l_{k+M-1}$, $c_{z_{LM}}^M$ [see (8)] and $c_{z_{LI}}^M$ to feature constraints between the poses and the SLAM landmarks [see (6)], and finally $c_{z_{LN}}^M$ to feature constraints for the new SLAM landmarks, ${}^{I_{k+1}}l_N$ [see (6)].

Hereafter, we employ the cost terms in (9) to describe the four main steps of the proposed IKS (see Section 3.2).

Prior Propagation.

The prior pdf $\mathcal{N}(\hat{x}_{I_{k+1}}^{\ominus}, P_{I_{k+1}}^{\ominus})$ and the inertial measurements $u_{k+1:k+M}$ are used to generate a prior pdf $\mathcal{N}(\hat{x}_{I_{k+1:k+M}}^{\ominus}, P_{I_{k+1:k+M}}^{\ominus})$ over all the states, $x_{k+1:k+M}$, within the sliding window. Through this process, the cost function in (9) takes the form:

$$c_{M+k}(\tilde{x}^*_{I_{k+1:k+M}}, {}^{I_{k+1}}\tilde{l}^*_{k+M}) = c_{P_{I_{k+1:k+M}}^{\ominus}} + c_L + c_{z_M}^K + \quad (10)$$
$$c_{z_I}^K + c_{z_{LM}}^K + c_{z_{LI}}^K + c_{z_{LN}}^K + c_M + c_{z_{LM}}^M + c_{z_{LI}}^M + c_{z_{LN}}^M$$

where $$c_{P_{I_{k+1:k+M}}^{\ominus}} = c_{P_{I_{k+1}}^{\ominus}} + \sum_{l=k+1}^{k+M-1} c_{u_{l,l+1}}$$

corresponds to the prior $\mathcal{N}(\hat{x}_{I_{k+1:k+M}}^{\ominus}, P_{I_{k+1:k+M}}^{\ominus})$. The mean $\hat{x}_{I_{k+1:k+M}}^{\ominus}$ is computed as:

$$\hat{x}_{I_{k+i}}^{\ominus} = \begin{cases} \hat{x}_{I_{k+1}}^{\ominus} & , i=1 \\ f(x^*_{I_{k+i-1}}, u_{k+i-1,k+i}) + \Phi^*_{k+i,k+i-1}\delta x_{k+i-1}^{\ominus} & , 2 \le i \le M \end{cases} \quad (11)$$

where $\delta x_{k+i-1}^{\ominus} = \hat{x}_{I_{k+i-1}}^{\ominus} - x^*_{I_{k+i-1}}$. Note that for the EKF inertial measurements are linearized and processed once, soon as they become available; hence, $\delta x_{k+i-1}^{\ominus} = 0$ and the mean of the prior pdf, $\hat{x}_{I_{k+i}}^{\ominus}$, coincides with the linearization point $x^*_{I_{k+i}}$. In contrast, the IKS re-processes inertial measurements by re-computing the prior over the sliding window $x_{I_{k+1:k+M}}$ through the process described in (11).

The block elements of the covariance $P_{I_{k+1:k+M}}^{\ominus}$ are computed through the EKF covariance propagation recursion, using, however, the most recent state estimates:

$$P_{I_{k+i}}^{\ominus} = \Phi^*_{k+i,k+i-1} P_{I_{k+i-1}}^{\ominus} \Phi^*_{k+i,k+i-1}{}^T + Q^*_k, i=2, \ldots, M$$

$$P_{I_{k+1:k+j}}^{\ominus} = \Phi^*_{k+i,k+j} P_{I_{k+j}}^{\ominus}, i=2, \ldots, M, j=1, \ldots, i-1 \quad (12)$$

State Update.

All cost terms, which provide multi-state (i.e., $c_L$, $c_{z_M}^K$, $c_{z_I}^K$, $c_{z_{LM}}^K$, $c_{z_{LI}}^K$, $c_{z_{LN}}^K$), as well as mapping (i.e., $c_M$, $c_{z_{LM}}^M$, $c_{z_{LI}}^M$, $c_{z_{LN}}^M$) constraints, are used for updating the state estimates for $x_{I_{k+1:k+M}}$ and ${}^{I_{k+1}}l_{k+M}$. Although each of these terms could have been used independently, in successive updates, we choose to first merge them into two cost terms, $c_S^K$ and $c_S^M$, comprising multi-state geometric and mapping constraints, respectively, and process them in a batch form.

Measurement Compression:

Combining all mapping terms, $c_M$, $c_{z_{LM}}^M$, $c_{z_{LI}}^M$, $c_{z_{LN}}^M$, into a single cost term, $c_S^{M'}$, yields:

$$c_S^{M'}(\tilde{x}^*_{I_{k+1:k+M}}, {}^{I_{k+1}}\tilde{l}^*_{k+M}) = \quad (13)$$

$$\left\| \begin{bmatrix} r_M^{*\ominus} \\ r_{LI}^{M*} \\ r_{LM}^{M*} \\ r_{LN}^{M*} \end{bmatrix} - \begin{bmatrix} H_M^{*\ominus} & F_M^{*\ominus} \\ H_{LI}^{M*} & F_{LI}^{M*} \\ & F_{LM}^{M*} \\ H_{LN}^{M*} & & F_{LN}^{M*} \end{bmatrix} \begin{bmatrix} \tilde{x}^*_{I_{k+1:k+M}} \\ {}^{I_{k+1}}\tilde{l}^*_{k+M-1} \\ {}^{I_{k+1}}l_N \end{bmatrix} \right\|^2_{\sigma^2 I} =$$

$$\left\| r_S^{M'} - [H_S^{M'*} \; F_S^{M'*}] \begin{bmatrix} \tilde{x}^*_{I_{k+1:k+M}} \\ {}^{I_{k+1}}\tilde{l}^*_{k+M} \end{bmatrix} \right\|^2_{\sigma^2 I}$$

The linearized constraints of (13) are projected onto the column space and left nullspace of $F_S^{M'*}$, which partitions $c_S^{M'}$ into, $3N_{k+M}$ constraints, denoted by $c_S^M$, providing information only over the landmarks $l_{k+M}$ and a cost term $c_S^{K'}$, providing geometric constraints, only over the poses $x_{I_{k+1:k+M}}$, i.e., $$c_S^{M'}(\tilde{x}^*_{I_{k+1:k+M}}, {}^{I_{k+1}}\tilde{l}^*_{k+M}) =$$

$$\left\| r_S^{M*} - [H_S^{M*} \; F_S^{M*}] \begin{bmatrix} \tilde{x}^*_{I_{k+1:k+M}} \\ {}^{I_{k+1}}\tilde{l}^*_{k+M} \end{bmatrix} \right\|^2_{\sigma^2 I_{3N_{k+M}}} + \left\| r_S^{K'*} - H_S^{K'*}\tilde{x}^*_{I_{k+1:k+M}} \right\|^2_{\sigma^2 I} =$$

$$c_S^M(\tilde{x}^*_{I_{k+1:k+M}}, {}^{I_{k+1}}\tilde{l}^*_{k+M}) + c_S^{K'}(\tilde{x}^*_{I_{k+1:k+M}})$$

which allows $c_{k+M}$ in (10) to take the form:

$$c_{k+M}\left(\tilde{x}^*_{I_{k+1:\,k+M}},\,{}^{I_{k+1}}\tilde{l}^*_{k+M}\right) = c_{P^\ominus_{I_{k+1:\,k+M}}} + c_S^M + c_S^K \qquad (14)$$

where, $c_S^K$ comprises all geometric constraints, i.e., $c_L$, $c_S^{K'}$, $c_{z_M}^K$, $c_{z_I}^K$, $c_{z_{LM}}^K$, $c_{z_{LI}}^K$ and $c_{z_{LN}}^K$:

$$c_S^K(\tilde{x}^*_{I_{k+1:k+M}}) = \|r_S^{K*} - H_S^{K*}\tilde{x}^*_{I_{k+1:k+M}}\|_{\sigma^2 I}^2. \qquad (15)$$

Note that, since $F_S^{M*}$ is a square full-rank matrix and for every $\tilde{x}^*_{I_{k+1:k+M}}$ there exists an ${}^{I_{k+1}}\tilde{l}^*_{k+M}$ that minimizes $c_S^M$ to zero, for minimizing (14), it suffices to first minimize $$c_{P^\ominus_{I_{k+1:\,k+M}}} + c_S^K,$$

over $$\tilde{x}^*_{I_{k+1:\,k+M}}$$

and then solve for ${}^{I_{k+1}}\tilde{l}^*_{k+M}$ using $c_S^M$. Specifically, through an I-EKF update step, estimator first updates the poses $x_{I_{k+1:k+M}}$:

$$x^*_{I_{k+1:k+M}}{}^\oplus = x^*_{I_{k+1:k+M}} + \tilde{x}_{I_{k+1:k+M}}{}^0, \tilde{x}_{I_{k+1:k+M}}{}^0 = \delta x_{k+1:k+M}{}^\ominus + P_{I_{k+1:k+M}}{}^\ominus H_S^{K*T} d_s \qquad (16)$$

where $d_s$ is the solution to the linear system $S^* d_s = r_S^{K*} - H_S^{K*}\delta x_{k+1:k+M}{}^\ominus$, with $S^* = H_S^{K*} P_{I_{k+1:k+M}}{}^\ominus H_S^{K*T} + \delta x_{k+1:k+M}{}^\ominus = \hat{x}_{k+1:k+M}{}^\ominus - x^*_{I_{k+1:k+M}}$.

Second, estimator 22 substitutes $\tilde{x}_{I_{k+1:k+M}}{}^0$ into $c_S^M$, and solves the linear system $$F_S^{M*} {}^{I_{k+1}}\tilde{l}_{k+M}{}^0 = r_S^{M*} - H_S^{M*}\tilde{x}_{I_{k+1:k+M}}{}^0 \qquad (17)$$

for updating the SLAM landmarks: ${}^{I_{k+1}}l^*{}^\oplus = {}^{I_{k+1}}l^* + {}^{I_{k+1}}\tilde{l}_{k+M}{}^0$.

It is important to note that processing immature observations (i.e., $\mathbb{Z}_I$ and $\mathbb{Z}_{LI}$) is optional for the IKS, allowing us to adjust its computational cost, based on the availability of computational resources.

Landmark Propagation.

Before proceeding with computing the next epoch's prior pdf $\mathcal{N}(\hat{x}_{I_{k+1}}{}^\oplus, P_{I_{k+1}}{}^\oplus)$ and linearized constraints, $f\{r^*_L{}^\oplus, H^*_L{}^\oplus\}$ and $\{r^*_M{}^\oplus, H^*_M{}^\oplus, F^*_M{}^\oplus\}$, all landmarks ${}^{I_{k+1}}l_{k+M}$ are expressed w.r.t. the new "tail" pose of the sliding window, $x_{I_{k+2}}$, in (9). The landmark parameters in the two frames $I_{k+1}$ and $I_{k+2}$, as well as the poses $x_{I_{k+1:k+2}}$, are related through a non-linear deterministic constraint, $g(x_{I_{k+1:k+2}}, {}^{I_{k+1}}l_{k+M}, {}^{I_{k+2}}l_{k+M}) = 0$, which after linearization, becomes:

$$G^*_{I_{k+1:k+2}}\tilde{x}^*_{I_{k+1:k+2}} + G^*_{I_{k+1,J}}{}^{I_{k+1}}\tilde{l}_{k+M} + G^*_{I_{k+2,J}}{}^{I_{k+2}}\tilde{l}_{k+M} = 0 \Leftrightarrow {}^{I_{k+1}}\tilde{l}^*_{k+M} = -G^*_{I_{k+1,J}}{}^{-1}(G^*_{I_{k+1:k+2}}\tilde{x}^*_{I_{k+1:k+2}} + G^*_{I_{k+2,J}}{}^{I_{k+2}}\tilde{l}^*_{k+M}) \qquad (18)$$

Substituting in (9), transforms $c_{K+M}$ to a function of $\tilde{x}^*_{I_{k+1:k+M}}$ and ${}^{I_{k+2}}\tilde{l}^*_{k+M}$.

Covariance Update.

During this step, estimator 22 computes the posterior $\mathcal{N}(\hat{x}_{I_{k+2}}{}^\oplus, P_{I_{k+2}}{}^\oplus)$, which will be used as the prior pdf during the next epoch. To do so, estimator 22 operates on those terms of the cost function in (9) that contain the state $x_{I_{k+1}}$, which is about to be marginalized; that is the cost function:

$$c_{k+M}^M = \qquad (19)$$

$$c_{P^\ominus_{I_{k+1}}} + c_{u_{k+1:\,k+2}} + c_L + c_{z_M}^K + c_{z_{LM}}^K + c_{z_{LN}}^K + c_M + c_{z_{LM}}^M + c_{z_{LN}}^M$$

In one example implementation, estimator 22 follows a 4-step process:

1) Prior propagation and 2) measurement compression: Following the same process, estimator 22 uses the prior $\mathcal{N}(\hat{x}_{I_{k+1}}{}^\ominus, P_{I_{k+1}}{}^\ominus)$ and the inertial measurements $u_{k+1:k+2}$ to compute the prior $\mathcal{N}(\hat{x}_{I_{k+1:k+2}}{}^\ominus, P_{I_{k+1:k+2}}{}^\ominus)$, and merge the linearized constraints into two terms, $c_C^K$ and $c_C^M$, comprising multi-state and mapping constraints, respectively. Thus, (19) becomes:

$$c_{k+M}^M = c_{P^\ominus_{I_{k+1:\,k+2}}} + c_C^K + c_C^M \qquad (20)$$

3) Partitioning of the linearized constraints: Following the same process as in (6), we partition $c_C^K$ into $c_{C_1}^K$ and $c_{C_2}^K$, where the first term depends only on $\tilde{x}^*_{I_{k+1:k+2}}$, i.e., $c_C^K(\tilde{x}^*_{I_{k+1:k+M}}) = c_{C_1}^K(\tilde{x}^*_{I_{k+1:k+2}}) + c_{C_2}^K(\tilde{x}^*_{I_{k+1:k+M}})$, which after substitution in (20), yields:

$$c_{k+M}^M = c_{P^\ominus_{I_{k+1:\,k+2}}} + c_{C_1}^K(\tilde{x}^*_{I_{k+1:\,k+2}}) + c_{C_2}^K(\tilde{x}^*_{I_{k+1:\,k+M}}) + c_C^M. \qquad (21)$$

4) Covariance Update: At this point, the first two terms in (21) are combined, thus updating the prior pdf $\mathcal{N}(x_{I_{k+1:k+2}}{}^\ominus, P_{I_{k+1:k+2}}{}^\ominus)$:

$$c_{k+M}^M = c_{P^\oplus_{I_{k+1:\,k+2}}} + c_{C_2}^K + c_C^M. \qquad (22)$$

$\mathcal{N}(x_{I_{k+1:k+2}}{}^\oplus, P_{I_{k+1:k+2}}{}^\oplus)$ has mean $\hat{x}_{I_{k+1:k+2}}{}^\oplus = \hat{x}_{I_{k+1:k+2}}{}^\ominus + P_{I_{k+1:k+2}}{}^\ominus H_{C_1}^{K*T} d_C$, where $d_C$ is the solution to the linear system $S_C d_C = H_{C_1}^{K*T} \delta x_{k+1:k+2}{}^\ominus$, with $S_C = H_{C_1}^{K*} P_{I_{k+1:k+2}}{}^\ominus H_{C_1}^{K*T} + \sigma^2 I_{N_1}$, and covariance $P_{I_{k+1:k+2}}{}^\oplus = P_{I_{k+1:k+2}}{}^\ominus (I - H_{C_1}^{K*T} S_C^{-1} H_{C_1}^{K*} P_{I_{k+1:k+2}}{}^\ominus)$.

Construction of Next Epoch's Prior.

During this last step of the IKS, estimator 22 brings $c_{k+M}^M$ into a form whose minimization is independent of $x_{I_{k+1}}$. To achieve this, estimator 22 follows a 2-step process.

1) Partitioning of $$c_{P^\oplus_{I_{k+1:\,k+2}}}$$

By employing the Schur complement, the prior term $$c_{P^\oplus_{I_{k+1:\,k+2}}}$$

in (22) is partitioned into a prior over $$x_{I_{k+2}}, c_{P^\oplus_{I_{k+2}}},$$

and a conditional term, $c_{I_{k+1:k+2}}$, representing linearized constraints between $x_{I_{k+1}}$ and $x_{I_{k+2}}$, i.e., $$c_{P_{I_{k+1:k+2}}^{\oplus}}(\tilde{x}_{I_{k+1:k+2}}^*) = \|\tilde{x}_{I_{k+2}}^* - \delta x_{I_{k+2}}^{\oplus}\|_{P_{I_{k+2}}^{\oplus}} + \quad (23)$$

$$\left\|\delta x_{I_{k+1|k+2}}^{\oplus} - [I - P_{I_{k+1,k+2}}^{\oplus} P_{I_{k+2}}^{\oplus -1}]\begin{bmatrix}\tilde{x}_{I_{k+1}}^*\\ \tilde{x}_{I_{k+2}}^*\end{bmatrix}\right\|_{P_{I_{k+1|k+2}}^{\oplus}}^2 =$$

$$c_{P_{I_{k+2}}^{\oplus}}(\tilde{x}_{I_{k+2}}^*) + c_{I_{k+1|k+2}}(\tilde{x}_{I_{k+1:k+2}}^*)$$

where $P_{I_{k+1|k+2}}^{\oplus} = P_{I_{k+1}}^{\oplus} - P_{I_{k+1,k+2}}^{\oplus} P_{I_{k+2}}^{\oplus -1} P_{I_{k+2,k+1}}^{\oplus}$. Substituting in (22), yields:

$$c_{k+M}^M = c_{P_{I_{k+2}}^{\oplus}} + c_{I_{k+1|k+2}} + c_{C_2}^M + c_C^M. \quad (24)$$

2) Marginalization of $x_{I_{k+1}}$: Firstly, all terms involving $x_{I_{k+1}}$, i.e., $c_{I_{k+1|k+2}}$, $c_{C_2}^M$ and $c_C^M$ are combined into a single quadratic cost, corresponding to $15 + N_{C_2}^K + 3N_{K+M}$ linearized constraints:

$$c_J(\tilde{x}_{I_{k+1:k+M}}^*, I_{k+2}\tilde{f}_{k+M}^*) = \quad (25)$$

$$\left\|b - J_1\tilde{x}_{I_{k+1}}^* - J_2\begin{bmatrix}\tilde{x}_{I_{k+2:k+M}}^*\\ I_{k+2}\tilde{f}_{k+M}^*\end{bmatrix}\right\|_{15+N_C^K+3N_{K+M}}^2$$

Following the same process as in (6), $c_J$ is partitioned into $c_{I_{k+1|k+2:k_M^*}}$, that contains all information regarding $x_{I_{k+1}}$, and $c_L^{\oplus}$ and $c_{M^{\oplus}}$, which are independent of $x_{I_{k+1}}$:

$$c_J(\tilde{x}_{I_{k+1:k+M}}^*, I_{k+2}\tilde{f}_{k+M}^*) = c_{I_{k+1|k+2:k+M}} + c_L^{\oplus} + c_M^{\oplus}. \quad (26)$$

where the detailed analytical expressions for $c_L^{\oplus}$ and $c_M^{\oplus}$ are given in [17].

Substituting (26) in (24), yields:

$$c_{k+M}^M(\tilde{x}_{I_{k+1:k+M}}^*, I_{k+2}\tilde{f}_{k+M}^*) = c_{P_{I_{k+2}}^{\oplus}}(\tilde{x}_{I_{k+2}}^*) + c_L^{\oplus}(\tilde{x}_{I_{k+2:k+M}}^*) + \quad (27)$$

$$c_{M^{\oplus}}(\tilde{x}_{I_{k+2:k+M}}^*, I_{k+2}\tilde{f}_{k+M}^*) + c_{I_{k+1|k+2:k+M}}(\tilde{x}_{I_{k+2:k+M}}^*, I_{k+2}\tilde{f}_{k+M}^*).$$

The last term, $c_{I_{k+1|k+2:k+M}}$ in (27), is irrelevant for the minimization of $C_{k+M}^M$ over $\tilde{x}_{I_{k+2:k+M}}^*$ and $I_{k+2}\tilde{f}_{k+M}^*$ since, for any of their values, there exists a $\tilde{x}_{I_{k+1}}^\circ$ that minimizes $c_{I_{k+1|k+2:k+M}}$ to exactly zero. Hence, all prior information from the current to the next IKS recursion, is represented completely through the terms $$c_{P_{I_{k+2}}^{\oplus}},$$

$c_L^{\oplus}$ and $c_{M^{\oplus}}$ all of which do not involve $\tilde{x}_{I_{k+1}}^*$.

Simulations.

Simulations were performed that involved a MEMS-quality commercial grade IMU, similar to those present on current mobile devices, running at 100 Hz, and a wide (1750 degrees) field of view camera with resolution 640×480. Visual observations were contaminated by zero-mean white Gaussian noise with σ=1:0 pixel. The Root Mean Square Error (RMSE) for the real-time estimates of the MSC-KF VINS (denoted as EKF) were compared with that of the iterative Kalman smoother (denoted as IKS) as described herein. Both estimators maintained a sliding window of 10 camera poses. Feature tracks that spanned beyond the sliding window were initialized as SLAM landmarks (and marginalized when lost from the camera's field of view), while shorter feature tracks were processed as MSC-KF features.

Figure 6A:
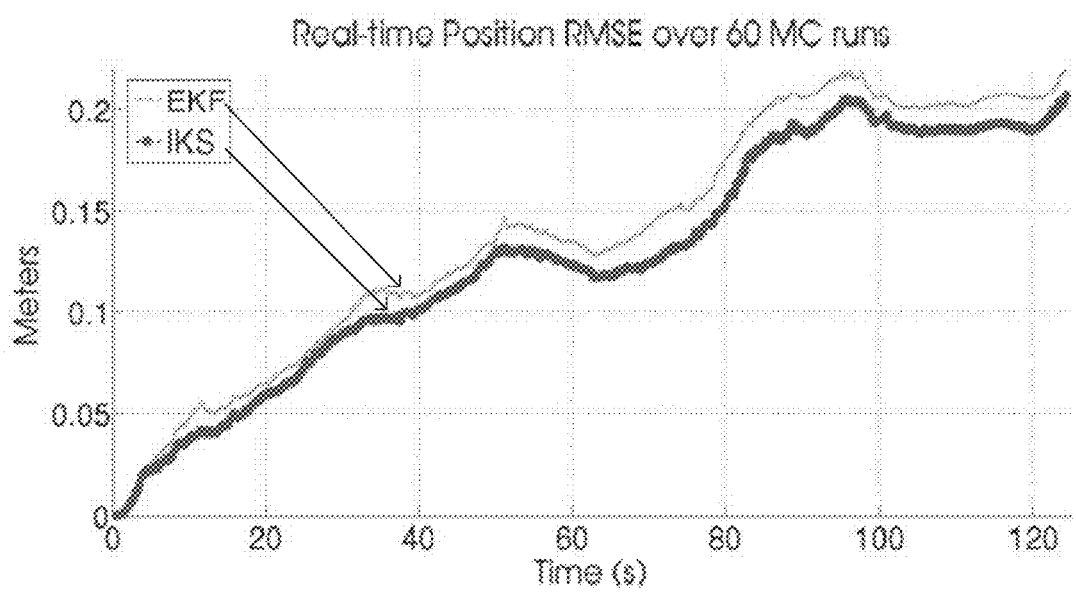
FIGS. 6A and 6B are graphs that show results for a first simulation comparing the described IKS versus the EKF under normal conditions.
Figure 6B:
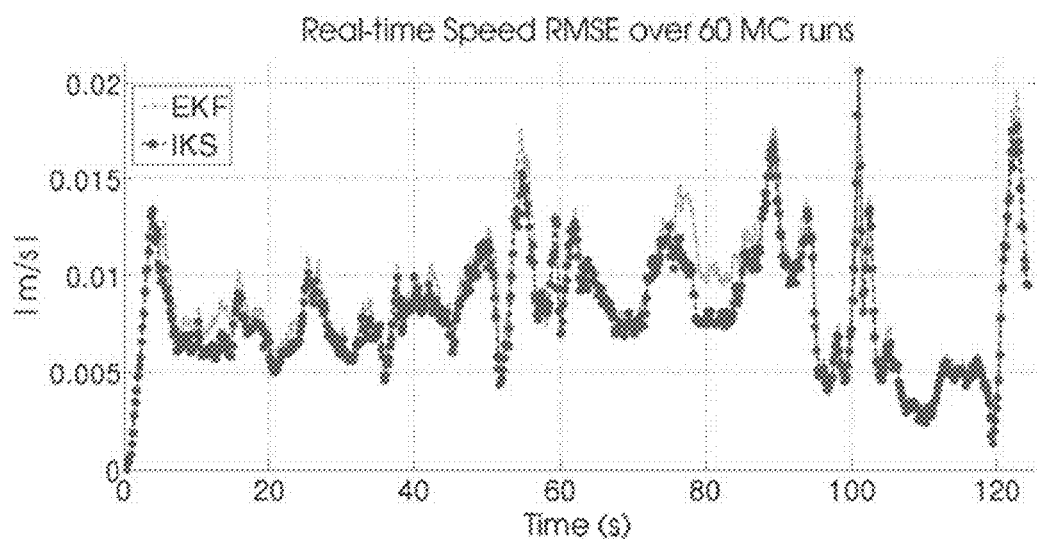

VINS Under Nominal Conditions:

In Simulation I, the platform's trajectory and dynamics resembled those of a person traversing 120 m of an indoor environment, while new camera poses were generated every 25 cm, and the rate that new features enter the camera's field of view followed that of real-world experimental trials. FIGS. 6A and 6B are graphs that show simulated results comparing the described IKS versus the EKF under these conditions. As seen in FIG. 6A, the performance difference between the EKF-based VINS and the proposed IKS is rather small, since in the presence of many visual measurements, both estimators are able to accurately track the system's state. Note however, that even under these nominal conditions the IKS always maintained a more accurate estimate of the platform's speed (see FIG. 6b), while for certain parts of the trajectory its estimate improved by ~20%, over the EKF, due to the inability of the latter to process feature tracks immediately as they become available.

Figure 7A:
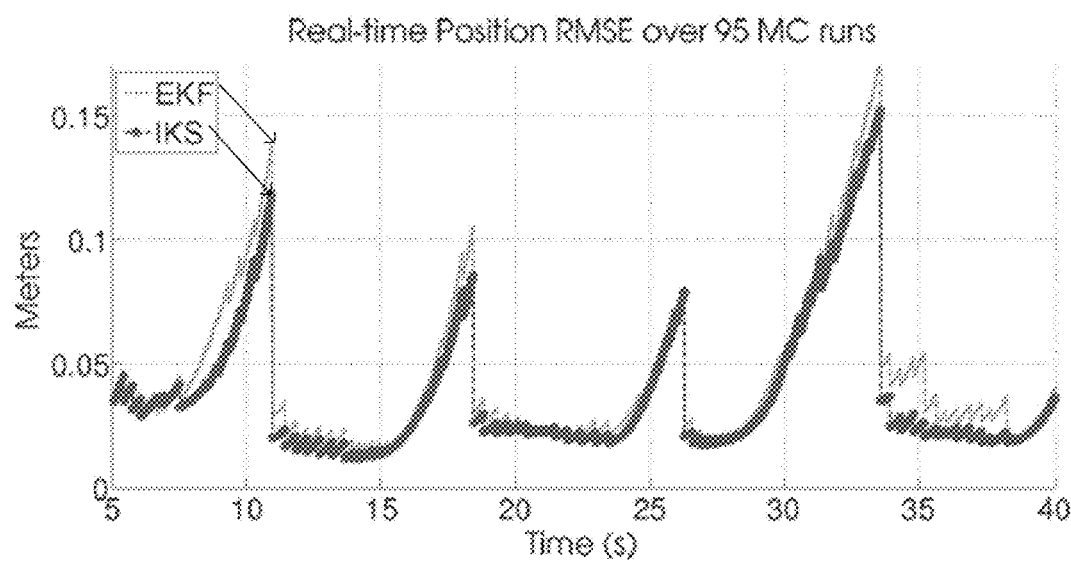
FIGS. 7A and 7B are graphs that show results for a second simulation comparing the described IKS versus the EKF under camera occlusions.
Figure 7B:
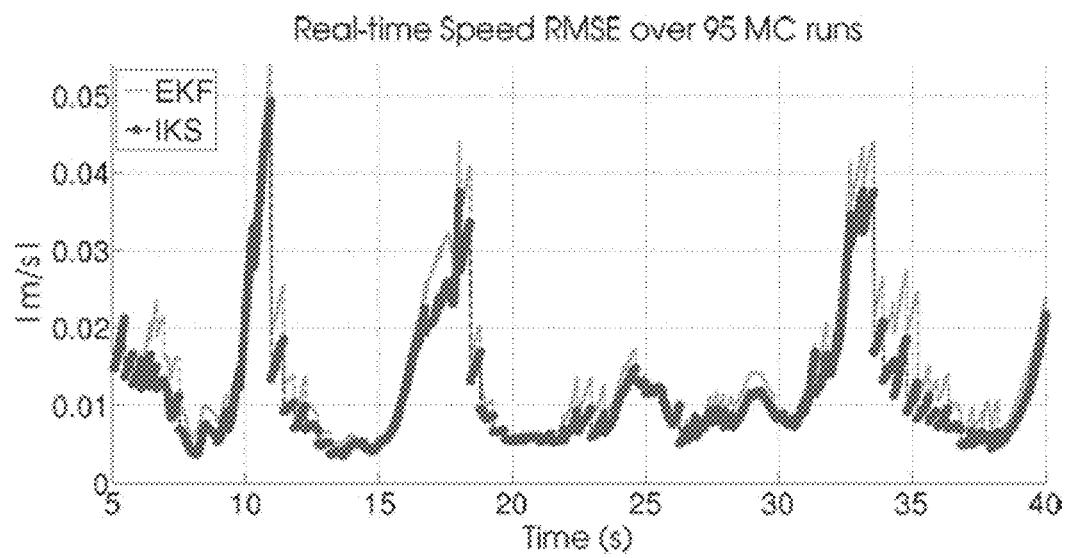

Camera Occlusions:

In Simulation II, the motion of a handheld device "hovering" over the same scene for 40 s was simulated, thus emulating a common scenario for augmented-reality applications. The simulation then introduced 3 periods, of approximately 5 s each, during which the camera was occluded and no feature tracks were available. As evident from FIGS. 7A and 7B, by re-processing visual and inertial measurements, the IKS, converges faster to the correct position and velocity estimates, right after re-gaining access to camera measurements.

Experiments.

The described IKS estimators were then validated on real-world data, using a Project Tango developer tablet, and as ground truth the result of a batch least-squares (BLS) over the entire set of visual and inertial measurements. The real-time estimates of the proposed IKS were compared to those of the MSC-KF VINS, both of which processed measurements to SLAM landmarks, as well as MSC-KF feature tracks, and maintained a sliding window of length 14.

Figure 8A:
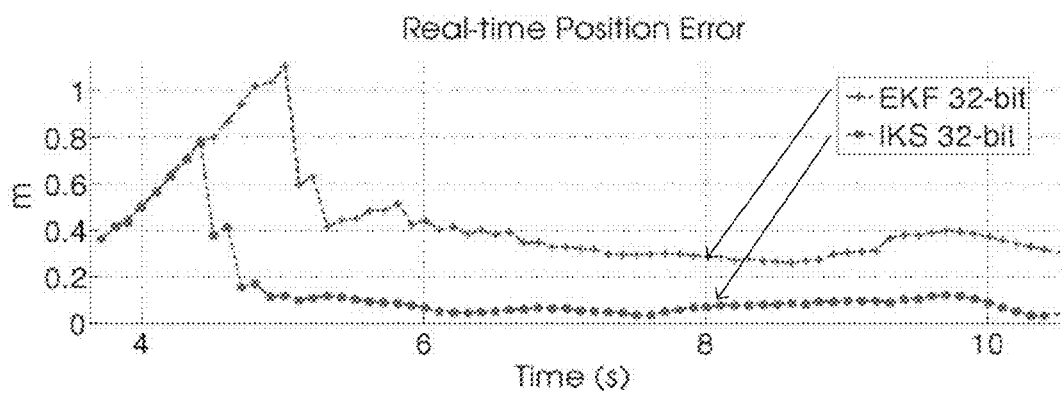
FIGS. 8A and 8B are graphs comparing results from a first experiment for the described IKS versus the EKF during filter initialization.
Figure 8B:
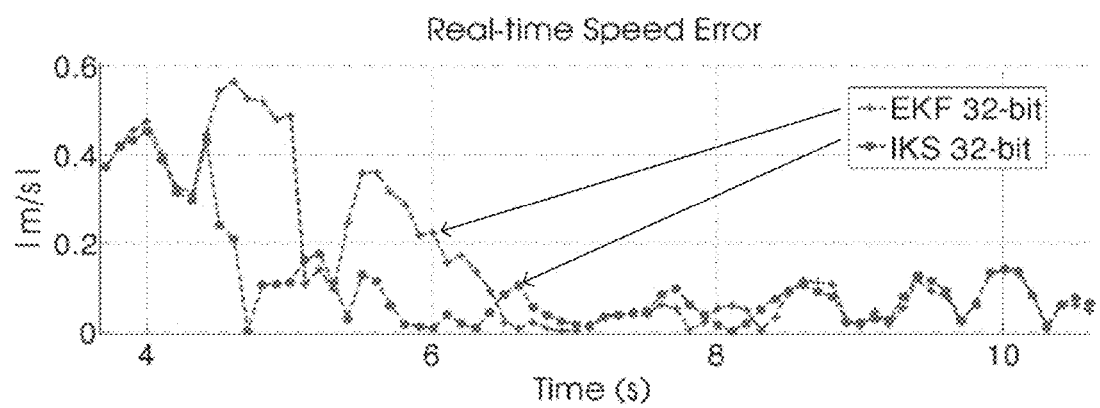

Initialization:

In Experiment I, the initialization phase of both estimators when they start from inaccurate estimates of their initial velocity and IMU biases, as often happens in practice, were compared. FIGS. 8A and 8B are graphs comparing results for the first experiment for the described IKS versus the EKF during filter initialization. FIG. 8A shows real-time position error while FIG. 8B shows real-time speed error. As it is seen in FIG. 8B, the IKS techniques described herein converged faster to its correct velocity estimates, which lead to a reduced position error, as compared to the EKF, for the rest of their trajectories [FIG. 8A]. Note that a BLS over a small set of initial poses, could have been used for system initialization, potentially making both estimators equally accurate. Such a choice, however, would inevitably introduce a significant time delay, a key drawback for real-time applications, while the complexity of the corresponding implementation would significantly increase. For the IKS, however, an iterative optimization during its initial phase, seamlessly takes place, without the need to transition from BLS to filtering.

Figure 9A:
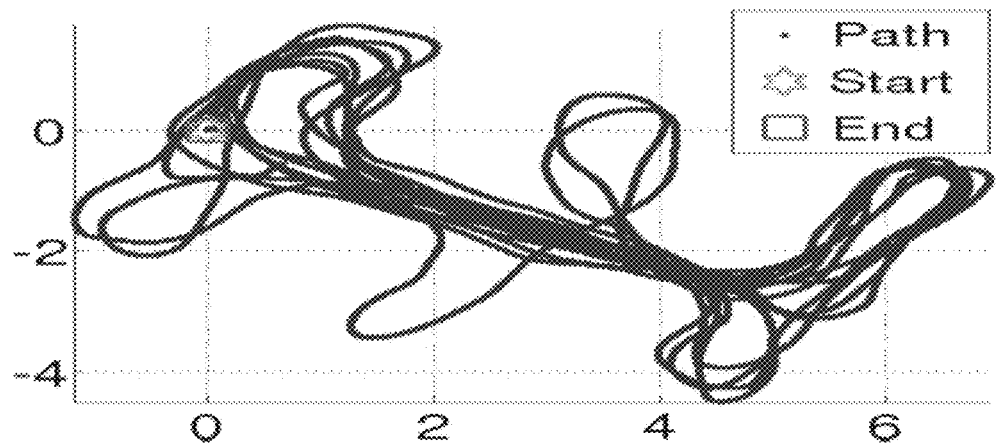
FIGS. 9A-9D are graphs comparting results from a second experiment that utilized sudden camera turns within an environment.
Figure 9B:
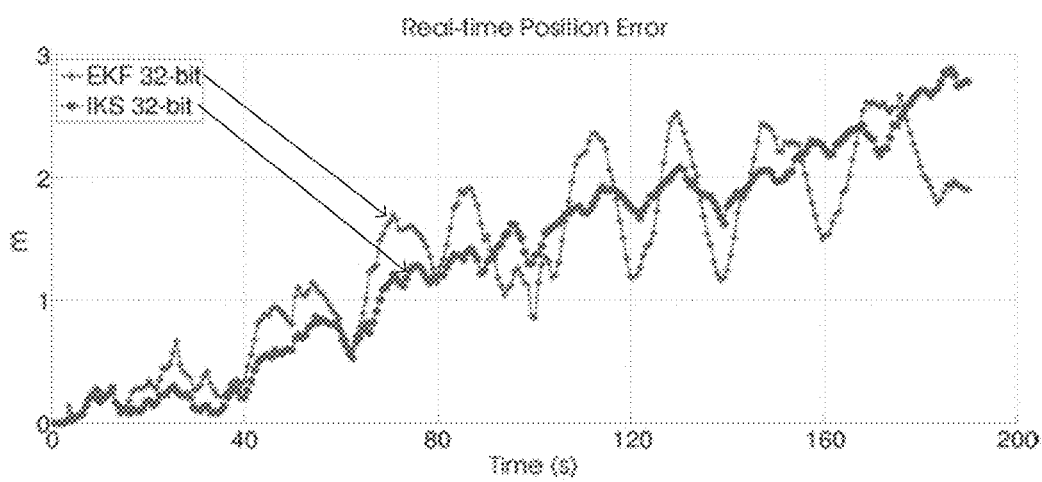
Figure 9C:
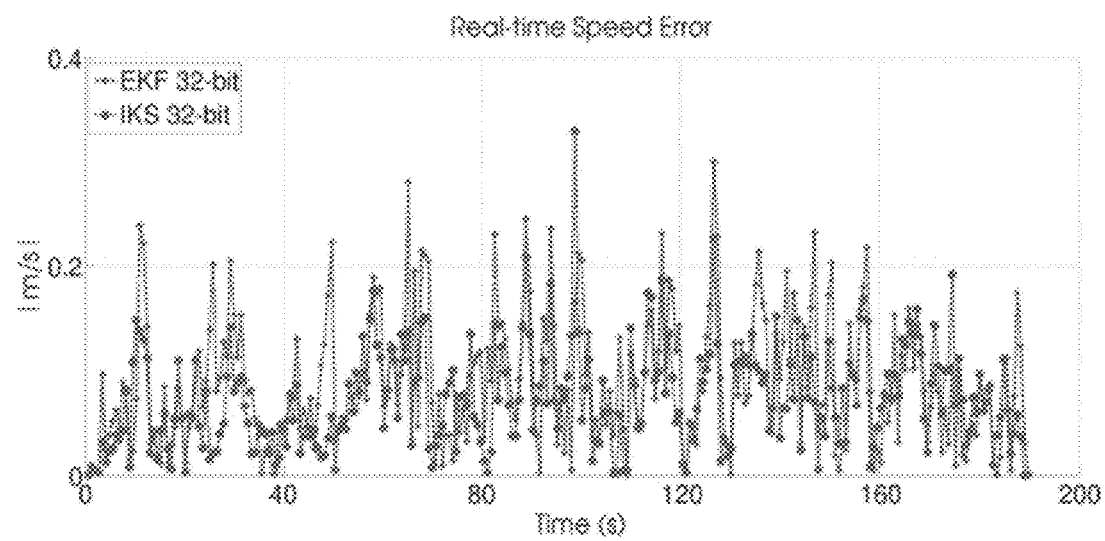
Figure 9D:
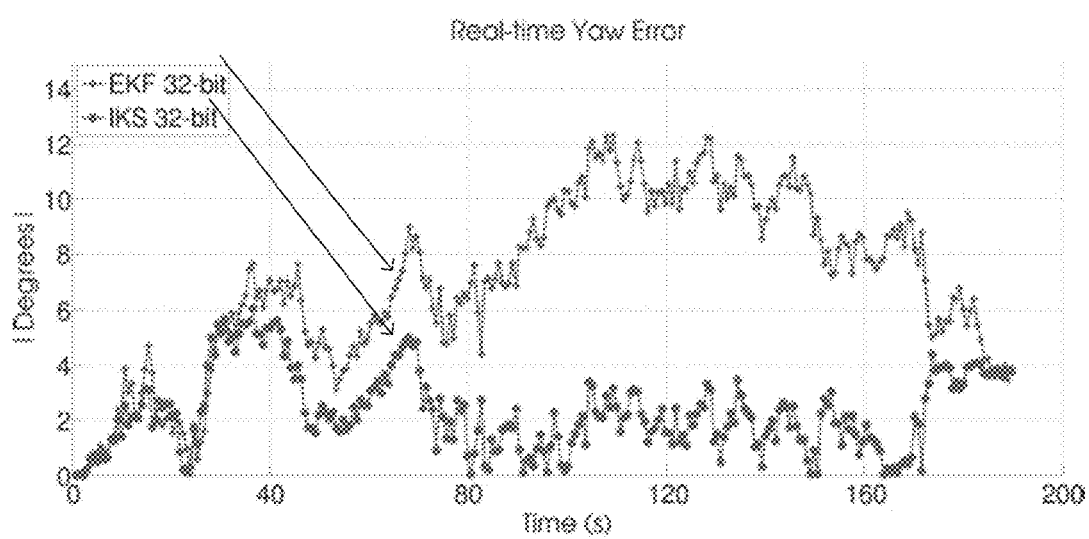

Fast Camera Turns:

In Experiment II, a "stress" dataset, during which the camera performed quick turns inside an office area causing abrupt reductions in the number, quality, and length of feature tracks for short periods of time, was collected and utilized. FIGS. 9A-9D are graphs comparting results from the second experiment that utilized sudden camera turns within an environment. FIG. 9A shows the 3D trajectory. FIG. 9B compares the position error. FIG. 9C compares the speed error. FIG. 9D compares the yaw error. As it is evident from FIG. 9D, the inability of the EKF to re-process visual observations, caused sudden accumulations of yaw error, e.g., at 40 s. Furthermore, on par with the simulation results described above, the IKS maintained an improved real-time estimate, of the platform's velocity, throughout the experiment, while at certain points, its velocity estimate was even two times better than the EKF's [FIG. 9C].

Timing Analysis:

A Samsung S4 cell phone was used as a testbed for comparing the processing time of the proposed IKS, with and without processing of immature visual observations, denoted by IKS w/, and IKS w/o, respectively, as well as, a reference EKF implementation. Albeit the 32-bit arithmetic precision, of the NEON co-processor, present on the 1.6 GHz Cortex-A15 ARM CPU of the Samsung S4, no numerical inaccuracies were introduced, when compared to 64-bit arithmetic precision. All estimators maintained a sliding window of 14 poses and on average 5 SLAM landmarks in their state vector. As it is evident from Table 1, the proposed IKS achieves real-time performance, even under re-linearization, while it is able to bring its cost down to levels comparable to the EKF by temporary disabling the re-processing of visual observations.

TABLE 1

Timing analysis on the Samsung S4: Numbers denote average time in ms.

| Step | Algorithm | | |
|---|---|---|---|
| | IKS w/ | IKS w/o | EKF |
| Propagation | 14 | 14 | 1 |
| Jacobians Calculation | 101 | 12 | 9 |
| Measurement Compressions | 14 | 6 | 2 |
| State Update | 12 | 12 | 12 |
| Covariance Update | 0.5 | 0.5 | 18 |
| Prior Constraints Update | 1.5 | 1.5 | N/A |
| Total | 166 | 46 | 42 |

Figure 10:
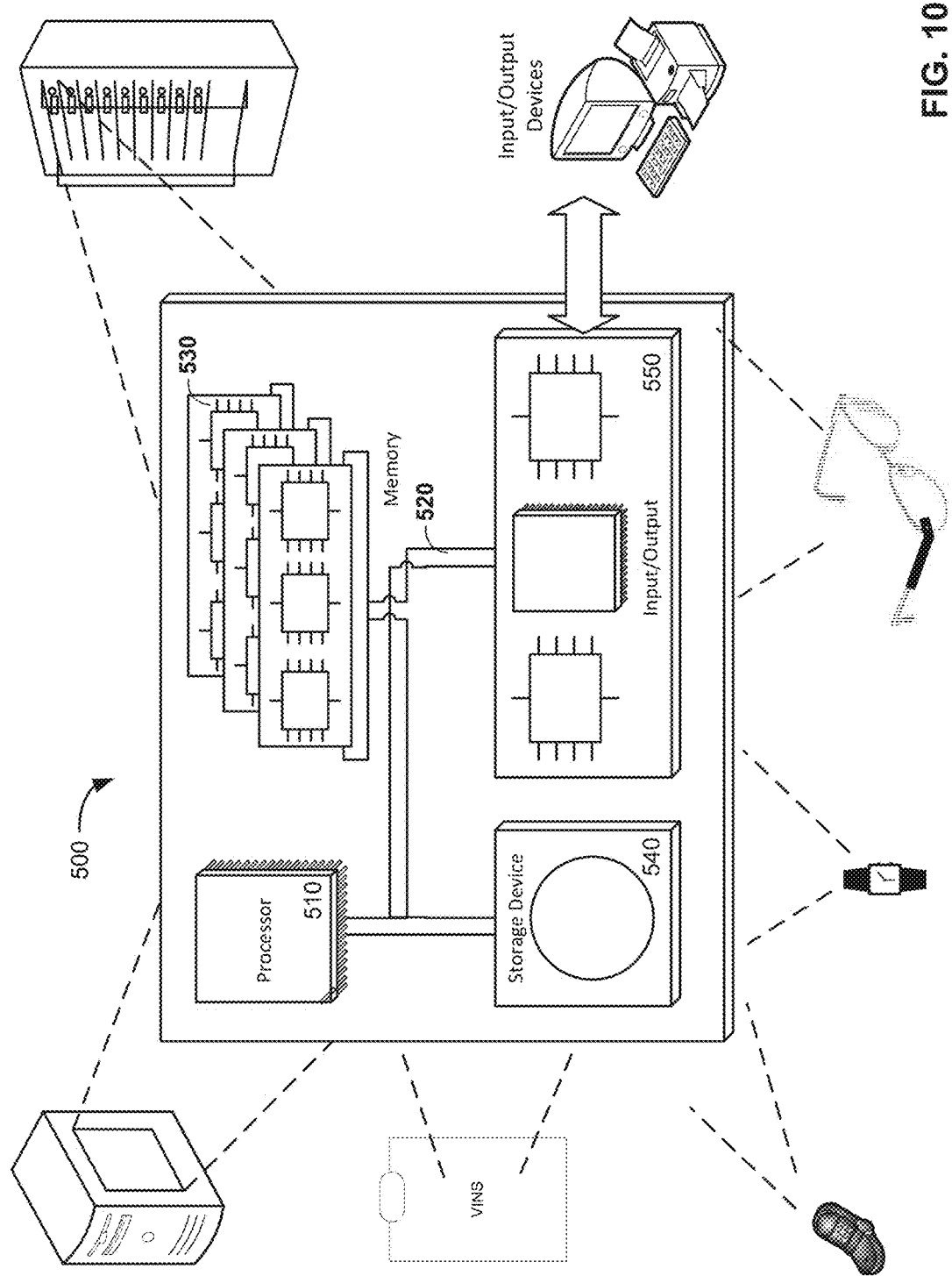
FIG. 10 shows a detailed example of various devices that may be configured to implement some embodiments in accordance with the current disclosure.

FIG. 10 shows a detailed example of various devices that may be configured to implement some embodiments in accordance with the current disclosure. For example, device 500 may be a robot, mobile sensing platform, a mobile phone, a wearable device such as a smartphone or smart watch, a workstation, a computing center, a cluster of servers or other example embodiments of a computing environment, centrally located or distributed, capable of executing the techniques described herein. Any or all of the devices may, for example, implement portions of the techniques described herein for a vision-aided inertial navigation system.

In this example, a computer 500 includes a hardware-based processor 510 that is operable to execute program instructions or software, causing the computer to perform various methods or tasks, such as performing the enhanced estimation techniques described herein. Processor 510 may be a general purpose processor, a digital signal processor (DSP), a core processor within an Application Specific Integrated Circuit (ASIC) and the like. Processor 510 is coupled via bus 520 to a memory 530, which is used to store information such as program instructions and other data while the computer is in operation. A storage device 540, such as a hard disk drive, nonvolatile memory, or other non-transient storage device stores information such as program instructions, data files of the multidimensional data and the reduced data set, and other information. As another example, computer 500 may provide an operating environment for execution of one or more virtual machines that, in turn, provide an execution environment for software for implementing the techniques described herein.

The computer also includes various input-output elements 550, including parallel or serial ports, USB, Firewire or IEEE 1394, Ethernet, and other such ports to connect the computer to external device such a printer, video camera, surveillance equipment or the like. Other input-output elements include wireless communication interfaces such as Bluetooth, Wi-Fi, and cellular data networks.

The computer itself may be a traditional personal computer, a rack-mount or business computer or server, or any other type of computerized system. The computer in a further example may include fewer than all elements listed above, such as a thin client or mobile device having only some of the shown elements. In another example, the computer is distributed among multiple computer systems, such as a distributed server that has many computers working together to provide various functions.

The techniques described herein may be implemented in hardware, software, firmware, or any combination thereof. Various features described as modules, units or components may be implemented together in an integrated logic device or separately as discrete but interoperable logic devices or other hardware devices. In some cases, various features of electronic circuitry may be implemented as one or more integrated circuit devices, such as an integrated circuit chip or chipset.

If implemented in hardware, this disclosure may be directed to an apparatus such a processor or an integrated circuit device, such as an integrated circuit chip or chipset. Alternatively or additionally, if implemented in software or firmware, the techniques may be realized at least in part by a computer readable data storage medium comprising instructions that, when executed, cause one or more processors to perform one or more of the methods described above. For example, the computer-readable data storage medium or device may store such instructions for execution by a processor. Any combination of one or more computer-readable medium(s) may be utilized.

A computer-readable storage medium (device) may form part of a computer program product, which may include packaging materials. A computer-readable storage medium (device) may comprise a computer data storage medium such as random access memory (RAM), read-only memory (ROM), non-volatile random access memory (NVRAM), electrically erasable programmable read-only memory (EEPROM), flash memory, magnetic or optical data storage media, and the like. In general, a computer-readable storage medium may be any tangible medium that can contain or store a program for use by or in connection with an instruction execution system, apparatus, or device. Additional examples of computer readable medium include computer-readable storage devices, computer-readable memory, and tangible computer-readable medium. In some examples, an article of manufacture may comprise one or more computer-readable storage media.

In some examples, the computer-readable storage media may comprise non-transitory media. The term "non-transitory" may indicate that the storage medium is not embodied in a carrier wave or a propagated signal. In certain examples, a non-transitory storage medium may store data that can, over time, change (e.g., in RAM or cache).

The code or instructions may be software and/or firmware executed by processing circuitry including one or more processors, such as one or more digital signal processors (DSPs), general purpose microprocessors, application-specific integrated circuits (ASICs), field-programmable gate arrays (FPGAs), or other equivalent integrated or discrete logic circuitry. Accordingly, the term "processor," as used herein may refer to any of the foregoing structure or any other processing circuitry suitable for implementation of the techniques described herein. In addition, in some aspects, functionality described in this disclosure may be provided within software modules or hardware modules.

An iterative Kalman smoother (IKS) for vision-aided inertial navigation has been described that provides many advantages. Through smoothing, the proposed IKS iteratively re-linearizes both inertial and visual measurements over a single, or multiple overlapping, sliding windows, thus improving robustness. At the same time, the IKS inherits the excellent numerical properties of the Kalman filter, making it amenable to very efficient implementations (4-fold speed up on ARM NEON co-processor) using single-precision (32 bit) arithmetic. As part of our validation process, the resilience and efficiency of the proposed approach were demonstrated under adverse navigation conditions.

Various embodiments of the invention have been described. These and other embodiments are within the scope of the following claims.

The invention claimed is:
1. A vision-aided inertial navigation system comprising:
at least one image source to produce image data along a trajectory of the vision-aided inertial navigation system (VINS) within an environment, wherein the image data contains a plurality of features observed within the environment at a plurality of poses of the VINS along the trajectory;
an inertial measurement unit (IMU) to produce IMU data indicative of motion of the vision-aided inertial navigation system; and
a hardware-based processing unit comprising an estimator that computes, based on the image data and the IMU data, a sliding window of state estimates for at least a position and orientation of the vision-aided inertial navigation system for a plurality of poses of the VINS along the trajectory and respective covariances for each of the state estimates, each of the respective covariances representing an amount of uncertainty in the corresponding state estimate, and
wherein the estimator computes the state estimates by:
classifying the visual features observed at the poses of the VINS within the sliding window into at least a first set of the features and a second set of features as a function of a position within the sliding window for the respective pose from which the respective feature was observed, the second set of features being associated with one or more older poses than the first set of features within the sliding window,
applying an extended Kalman filter to update, within the sliding window, each of the state estimates for the VINS and the features using the IMU data and the image data obtained associated with both the first set of features and the second set of features observed from the plurality of poses within the sliding window, and
updating, for each of the state estimates, the respective covariance using the IMU data and the image data associated with the second set of features without using the image data associated with the first set of features.

2. The vision-aided inertial navigation system of claim 1, wherein when classifying the features into the first set of features and second set of features, the estimator classifies the visual features observed at the poses of the VINS within the sliding window into at least a set of the mature features and a set of the immature features as a function of the position within the sliding window for the respective pose of the VINS from which each of the features was observed.

3. The vision-aided inertial navigation system of claim 2, wherein the estimator is configured to:
computing a set of prior constraints linearly constraining the state estimates for the poses associated with the immature features to the state estimates associated with the mature features;
updating, within the sliding window, the states estimates for the VINS and for positions of the features within the environment using (1) all of the IMU data and the image data associated with features observed at any of the plurality of poses within the sliding window, (2) and the set of prior constraints; and
updating the covariances using (1) only the image data associated with the mature features and the IMU data that have reached an end of the sliding window and are about to be absorbed, (2) and the set of prior constraints.

4. The vision-aided inertial navigation system of claim 3, wherein the estimator applies the extended Kalman filter to update the state estimates using the covariance and the set of prior constraints without computing a Hessian matrix.

5. The vision-aided inertial navigation system of claim 1, wherein the estimator builds a map of the environment to include the state estimates of the VINS.

6. The vision-aided inertial navigation system of claim 1, wherein the vision-aided inertial navigation system is integrated within a tablet computer, a laptop computer, a mobile phone, a robot or a vehicle.

7. The vision-aided inertial navigation system of claim 1, wherein when classifying the features into the first set of features and second set of features, the estimator classifies the visual features observed at the poses of the VINS within the sliding window into two or more of the following categories:
1. SLAM re-observations (SRs) that correspond to observations of features being mapped,
2. Active Persistent Features (APFs) that correspond to feature tracks that span the whole window of camera poses and are actively tracked beyond the size of the current sliding window,
3. Inactive Persistent Features (IPFs) that correspond to feature tracks that span the whole window of camera poses but are not tracked beyond the size of the current sliding window,
4. Old Short Features (OSFs) that correspond to feature tracks that start from the oldest image but do not reach the newest (most recent) camera pose,
5. Opportunistic Features (OFs) that correspond to feature tracks that do not start from the oldest camera pose but are observed in the newest image, and 6. New Short Features (NSFs) that correspond to feature tracks that do not start from the oldest image and do not reach the newest image.

8. The vision-aided inertial navigation system of claim 1, wherein the estimator applies an estimation policy to deciding, based on the classification of the features, which measurements will be processed based on available computational resources for a current update of the state estimates.

9. The vision-aided inertial navigation system of claim 1, wherein the VINS comprises one of a robot, a vehicle, a mobile device or a wearable computing device.

10. A method for computing state estimates for a vision-aided inertial navigation system (VINS) comprising:
receiving image data along a trajectory of the VINS within an environment, wherein the image data contains a plurality of features observed within the environment at a plurality of poses of the VINS along the trajectory;
receiving inertial measurement data from an inertial measurement unit (IMU) indicative of motion of the vision-aided inertial navigation system; and
computing a sliding window of state estimates for a position and orientation of the vision-aided inertial navigation system for a plurality of poses of the VINS along the trajectory with a processing unit comprising an estimator,
wherein computing the state estimates comprises:
classifying the visual features observed at the poses of the VINS within the sliding window into a first set of features and a second set of features as a function of a position within the sliding window for the respective pose from which the respective feature was observed, the second set of features being associated with one or more older poses within the sliding window than the first set of features;
applying an extended Kalman filter to update, within the sliding window, each of the state estimates for the VINS and the features using the IMU data and the image data obtained associated with both the first set of features and the second set of features observed from the plurality of poses within the sliding window, and
updating, within the sliding window and for each of the state estimates, the respective covariance using the IMU data and the image data associated with the second set of features without using the IMU data and the image data associated with the first set of features.

11. The method of claim 10, wherein classifying the features into the first set of features and second set of features comprises classifying the visual features observed at the poses of the VINS within the sliding window into at least a set of the mature features and a set of the immature features as a function of the position within the sliding window for the respective pose from which each of the features was observed, the mature features associated with one or more older poses within the sliding window than the immature features.

12. The method of claim 11, wherein computing the state estimates comprises:
computing a set of prior constraints linearly constraining the state estimates for the poses associated with the immature features to the state estimates associated with the mature features;
updating, within the sliding window, the states estimates for the VINS and for positions of the features within the environment using (1) all of the IMU data and the image data associated with features observed at any of the plurality of poses within the sliding window, (2) and the set of prior constraints; and
updating the covariances using (1) only the image data associated with the mature features and the IMU data that have reached an end of the sliding window and are about to be absorbed, (2) and the set of prior constraints.

13. The method of claim 11, wherein applying the extended Kalman filter comprises applies the extended Kalman filter to update of the state estimates using the covariance and the set of prior constraints without computing a Hessian matrix.

14. The method of claim 10, wherein classifying the features into the first set of features and second set of features comprises classifying the visual features observed at the poses of the VINS within the sliding window into at least:
1. SLAM re-observations (SRs) that correspond to observations of features being mapped,
2. Active Persistent Features (APFs) that correspond to feature tracks that span the whole window of camera poses and are actively tracked beyond the size of the current sliding window,
3. Inactive Persistent Features (IPFs) that correspond to feature tracks that span the whole window of camera poses but are not tracked beyond the size of the current sliding window,
4. Old Short Features (OSFs) that correspond to feature tracks that start from the oldest image but do not reach the newest (most recent) camera pose,
5. Opportunistic Features (OFs) that correspond to feature tracks that do not start from the oldest camera pose but are observed in the newest image, and
6. New Short Features (NSFs) that correspond to feature tracks that do not start from the oldest image and do not reach the newest image.

15. The method of claim 10, further comprising, when applying the extended Kalman filter to compute the estimates, determining, based on the classification of the features, which measurements will be processed based on available computational resources for a current update of the state estimates.

16. The method of claim 10, wherein the VINS comprises one of a robot, a vehicle, a mobile device or a wearable computing device.

17. A non-transitory computer-readable storage device comprising program code to cause a processor to perform the operations of:
receiving image data along a trajectory of the vision-aided inertial navigation system (VINS) within an environment, wherein the image data contains a plurality of features observed within the environment at a plurality of poses of the VINS along the trajectory;
receiving inertial measurement data from an inertial measurement unit (IMU) indicative of motion of the vision-aided inertial navigation system; and
computing a sliding window of state estimates for a position and orientation of the vision-aided inertial navigation system for a plurality of poses of the VINS along the trajectory with a processing unit comprising an estimator,
wherein computing the state estimates comprises:
classifying the visual features observed at the poses of the VINS within the sliding window into a first set of features and a second set of features as a function of a position within the sliding window for the respective pose from which the respective feature was observed, the second set of features being associated with one or more older poses within the sliding window than the first set of features;

applying an extended Kalman filter to update, within the sliding window, each of the state estimates for the VINS and the features using the IMU data and the image data obtained associated with both the first set of features and the second set of features observed from the plurality of poses within the sliding window, and updating, within the sliding window and for each of the state estimates, the respective covariance using the IMU data and the image data associated with the second set of features without using the IMU data and the image data associated with the first set of features.

18. The non-transitory computer-readable storage device of claim 17, wherein classifying the features into the first set of features and second set of features comprises classifying the visual features observed at the poses of the VINS within the sliding window into at least a set of the mature features and a set of the immature features as a function of the position within the sliding window for the respective pose from which each of the features was observed, the mature features associated with one or more older poses within the sliding window than the immature features.

19. The non-transitory computer-readable storage device of claim 17, wherein computing the state estimates comprises:

computing a set of prior constraints linearly constraining the state estimates for the poses associated with the immature features to the state estimates associated with the mature features;

updating, within the sliding window, the states estimates for the VINS and for positions of the features within the environment using (1) all of the IMU data and the image data associated with features observed at any of the plurality of poses within the sliding window, (2) and the set of prior constraints; and updating the covariances using (1) only the image data associated with the second set of features and only the IMU data that has reached an end of the sliding window and is about to be absorbed, (2) and the set of prior constraints.

* * * * *